US012582111B2

(12) United States Patent
Bell

(10) Patent No.: US 12,582,111 B2
(45) Date of Patent: Mar. 24, 2026

(54) PEST TRAP APPARATUS

(71) Applicant: David Bell, Northridge, CA (US)

(72) Inventor: David Bell, Northridge, CA (US)

( * ) Notice: Subject to any disclaimer, the term of this patent is extended or adjusted under 35 U.S.C. 154(b) by 200 days.

(21) Appl. No.: 18/351,967

(22) Filed: Jul. 13, 2023

(65) Prior Publication Data

US 2025/0017194 A1    Jan. 16, 2025

(51) Int. Cl.
*A01M 23/06* (2006.01)
*A01M 23/12* (2006.01)
*A01M 23/14* (2006.01)

(52) U.S. Cl.
CPC ............ *A01M 23/06* (2013.01); *A01M 23/12* (2013.01); *A01M 23/14* (2013.01)

(58) Field of Classification Search
CPC ...... A01M 23/02; A01M 23/04; A01M 23/06; A01M 23/12; A01M 23/14
USPC ....................................................... 43/68–74
See application file for complete search history.

(56) References Cited

U.S. PATENT DOCUMENTS

| | | | | |
|---|---|---|---|---|
| RE14,080 E | * | 3/1916 | Fisher | ............................... 43/74 |
| 1,192,275 A | * | 7/1916 | Cloud | ................... A01M 23/04 |
| | | | | 43/69 |
| 1,436,272 A | * | 11/1922 | Mcelfresh | ............. A01M 23/08 |
| | | | | 43/69 |
| 1,769,453 A | * | 7/1930 | Parratt | .................. A01M 23/18 |
| | | | | 43/76 |
| 1,856,980 A | * | 5/1932 | Weaver | .................. A01M 23/00 |
| | | | | 43/67 |
| 2,107,080 A | * | 2/1938 | Macdonald | ........... A01M 23/06 |
| | | | | 250/221 |
| 2,128,808 A | * | 8/1938 | August | .................. A01M 23/02 |
| | | | | 43/76 |
| 2,463,839 A | * | 3/1949 | Wilson | ................... A01M 23/20 |
| | | | | 43/69 |
| 2,501,282 A | * | 3/1950 | Lundquist | ............. A01M 23/08 |
| | | | | 220/730 |
| 2,730,834 A | * | 1/1956 | Norris | ................... A01M 23/38 |
| | | | | 43/69 |
| 2,763,092 A | * | 9/1956 | Sheridan | ............... A01M 23/18 |
| | | | | 43/99 |

(Continued)

FOREIGN PATENT DOCUMENTS

| | | | | |
|---|---|---|---|---|
| CA | 2174387 A1 | * | 10/1997 | ............ A01M 23/04 |
| CA | 2621101 C | * | 10/2009 | ............ A01M 19/00 |

(Continued)

*Primary Examiner* — Darren W Ark
(74) *Attorney, Agent, or Firm* — CIONCA IP Law P.C.

(57) ABSTRACT

A pest trap apparatus having a trap chamber attached to an entry channel, a drop cover having a trap door disposed within the trap chamber, such that the trap door provides a floor to the trap chamber, a shuttle box nested within the trap chamber and supported by the trap door, a sensor associated with the trap chamber, the sensor being configured to generate and transmit a signal upon detecting a pest, a striker in electrical communication with the sensor, such that upon receiving the signal from the sensor, the striker is configured to impact and rotate the trap door downward, thus dropping the shuttle box within the trap chamber to prevent escape of pests and sending pests within the trap chamber down into a trap chute below the trap chamber, and an actuator configured to reset the trap door by rotating it upward to reengage with a trap latch.

13 Claims, 12 Drawing Sheets

(56) References Cited

U.S. PATENT DOCUMENTS

| | | | | |
|---|---|---|---|---|
| 2,881,553 A * | 4/1959 | Guzik | A01M 23/16 | 246/34 R |
| 3,936,972 A * | 2/1976 | Meyers | A01M 23/04 | 43/69 |
| 4,145,834 A * | 3/1979 | Quigley | A01M 23/12 | 43/73 |
| 4,154,016 A * | 5/1979 | Reyes | A01M 23/04 | 43/69 |
| 4,356,655 A * | 11/1982 | Morante | A01M 23/14 | 43/67 |
| 4,429,483 A * | 2/1984 | Murakami | A01M 23/06 | 43/70 |
| 4,550,524 A * | 11/1985 | Goebel | A01M 23/02 | 43/75 |
| 4,553,349 A * | 11/1985 | Tsai | A01M 23/06 | 43/73 |
| 4,612,724 A * | 9/1986 | Alboainin | A01M 27/00 | 43/79 |
| 4,641,456 A * | 2/1987 | Boharski | A01M 23/12 | 43/73 |
| 4,748,766 A * | 6/1988 | Stimac | A01M 23/04 | 43/69 |
| 4,876,821 A * | 10/1989 | Benzie | A01M 23/04 | 43/69 |
| 5,185,953 A * | 2/1993 | Gross | A01M 23/12 | 43/75 |
| 5,305,545 A * | 4/1994 | Cerullo | A01M 23/06 | 43/72 |
| 5,471,781 A * | 12/1995 | Vine | A01M 23/04 | 43/69 |
| 5,815,982 A * | 10/1998 | Garretson | A01M 1/12 | 43/73 |
| 5,953,853 A * | 9/1999 | Kim | A01M 23/38 | 43/61 |
| 6,016,623 A * | 1/2000 | Celestine | A01M 31/002 | 43/61 |
| 6,088,948 A * | 7/2000 | Rønnau | A01M 23/12 | 43/72 |
| 6,718,688 B2 * | 4/2004 | Garretson | A01M 1/103 | 43/73 |
| 12,495,788 B2 * | 12/2025 | Krehel | A01M 23/14 | |

| | | | | |
|---|---|---|---|---|
| 2006/0026893 A1 * | 2/2006 | Sears | A01M 23/04 | 43/69 |
| 2006/0032110 A1 * | 2/2006 | Yang | A01M 1/026 | 43/60 |
| 2006/0123693 A1 * | 6/2006 | Muller | A01M 31/002 | 43/99 |
| 2007/0245617 A1 * | 10/2007 | Deibert | A01M 31/002 | 43/72 |
| 2008/0120895 A1 * | 5/2008 | Schwartz | A01M 31/002 | 43/99 |
| 2009/0223112 A1 * | 9/2009 | Deibert | A01M 19/00 | 43/99 |
| 2015/0128480 A1 * | 5/2015 | Pinder | A01M 23/14 | 43/69 |
| 2015/0157006 A1 * | 6/2015 | Brown | G01V 8/10 | 43/60 |
| 2015/0335005 A1 * | 11/2015 | Ferrante | A01M 23/20 | 43/61 |
| 2017/0202205 A1 * | 7/2017 | Wu | A01M 23/18 | |
| 2018/0352801 A1 * | 12/2018 | Veber | A01M 23/08 | |
| 2022/0232817 A1 * | 7/2022 | Fuligni | A01M 23/06 | |
| 2022/0330539 A1 * | 10/2022 | Hansen | A01M 23/245 | |
| 2023/0301293 A1 * | 9/2023 | Casalanguida | A01M 23/04 | |

FOREIGN PATENT DOCUMENTS

| | | | | | |
|---|---|---|---|---|---|
| CN | 107041359 A | * | 8/2017 | | A01M 23/38 |
| CN | 213029602 U | * | 4/2021 | | |
| CN | 214126699 U | * | 9/2021 | | |
| CN | 215736569 U | * | 2/2022 | | |
| CN | 216415778 U | * | 5/2022 | | |
| DE | 400339 C | * | 8/1924 | | |
| DE | 550204 C | * | 5/1932 | | |
| FR | 859007 A | * | 12/1940 | | |
| GB | 2410667 A | * | 8/2005 | | A01M 23/04 |
| GB | 2575677 A | * | 1/2020 | | A01M 23/38 |
| JP | S6112241 A | * | 1/1986 | | |
| KR | 100943838 B1 | * | 2/2010 | | A01M 23/16 |
| WO | WO-2013173866 A1 | * | 11/2013 | | A01M 23/14 |
| WO | WO-2014111857 A1 | * | 7/2014 | | A01M 23/20 |
| WO | WO-2014203166 A1 | * | 12/2014 | | A01M 23/12 |
| WO | WO-2016074778 A1 | * | 5/2016 | | A01M 23/38 |
| WO | WO-2016097993 A1 | * | 6/2016 | | A01M 23/10 |
| WO | WO-2017081432 A1 | * | 5/2017 | | A01M 31/002 |
| WO | WO-2020026270 A1 | * | 2/2020 | | A01M 23/04 |

* cited by examiner

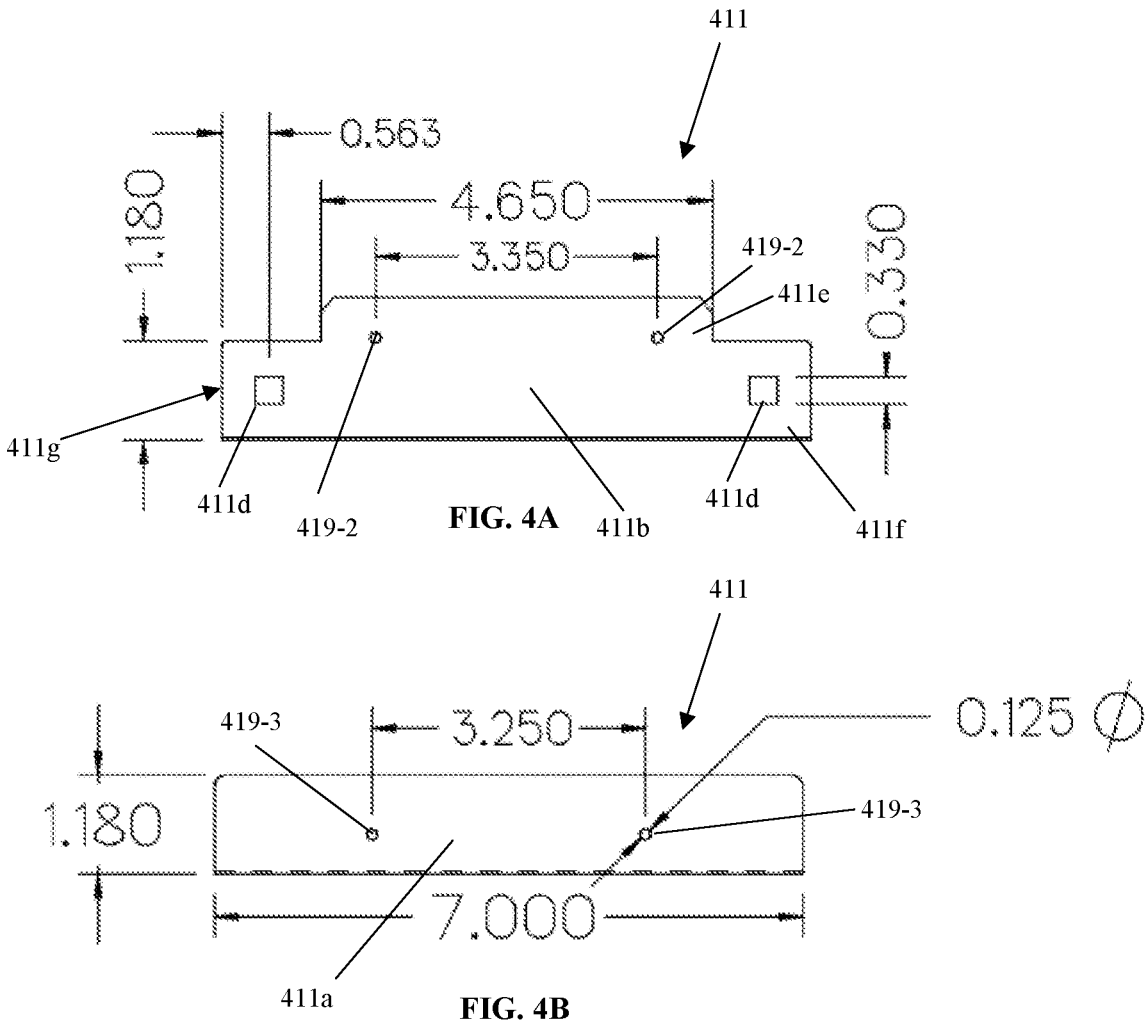
FIG. 4A
FIG. 4B
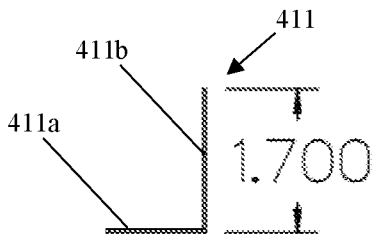
FIG. 4C

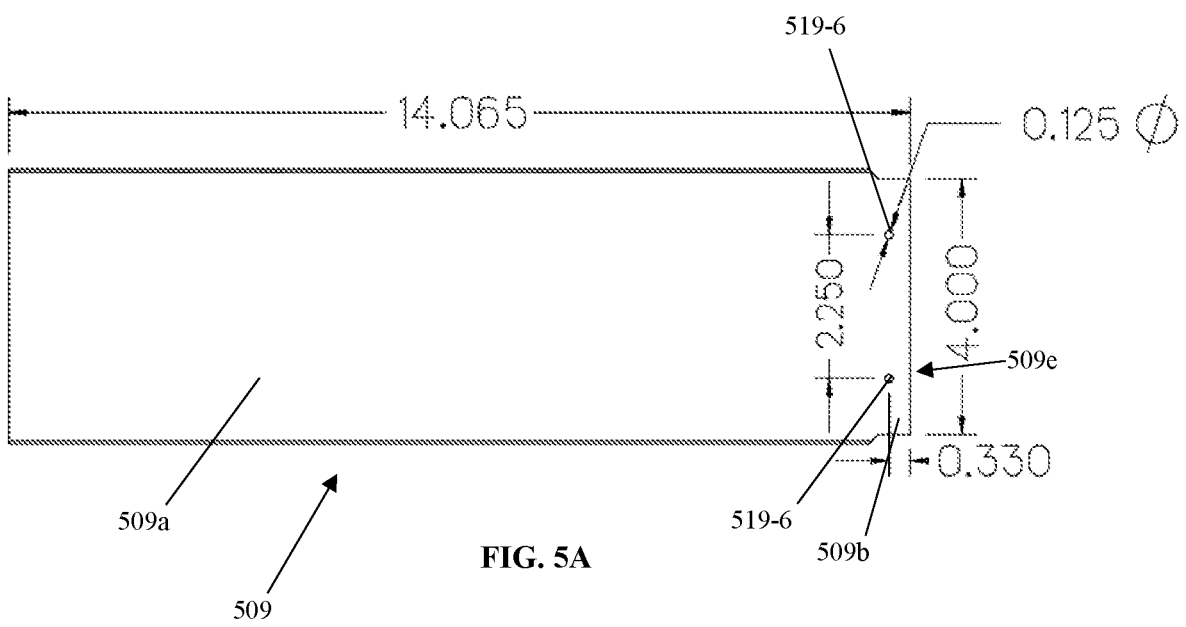
FIG. 5A
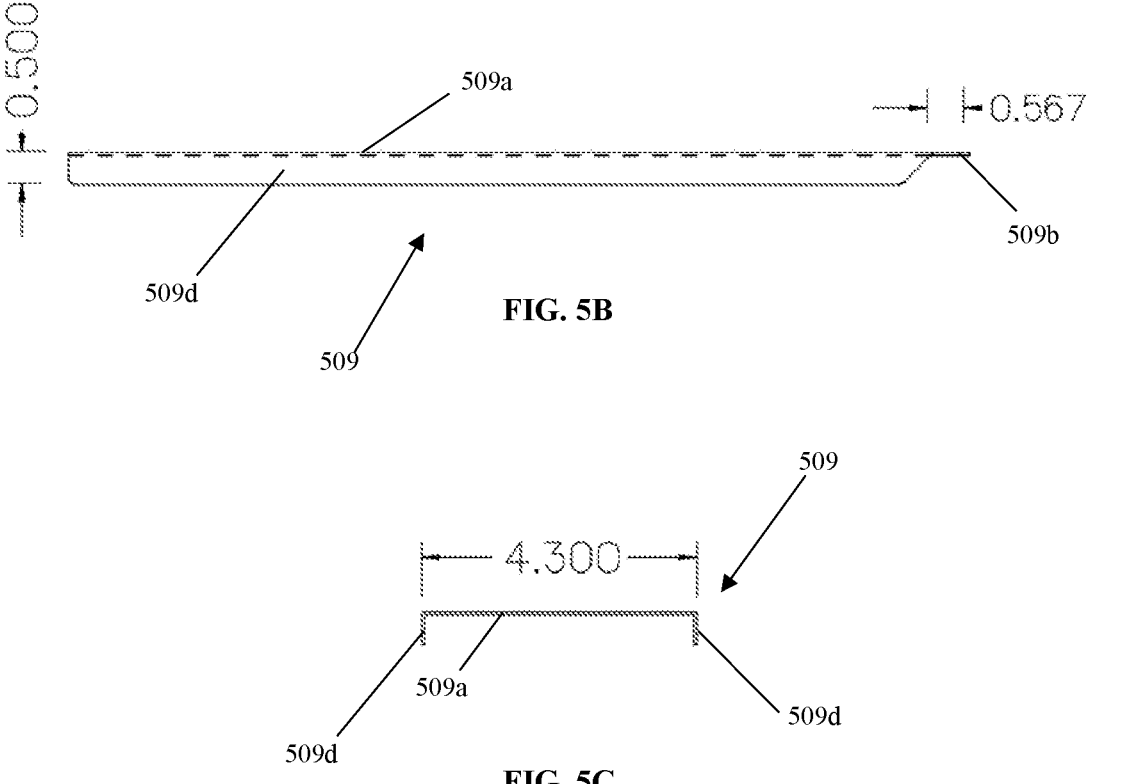
FIG. 5B
FIG. 5C

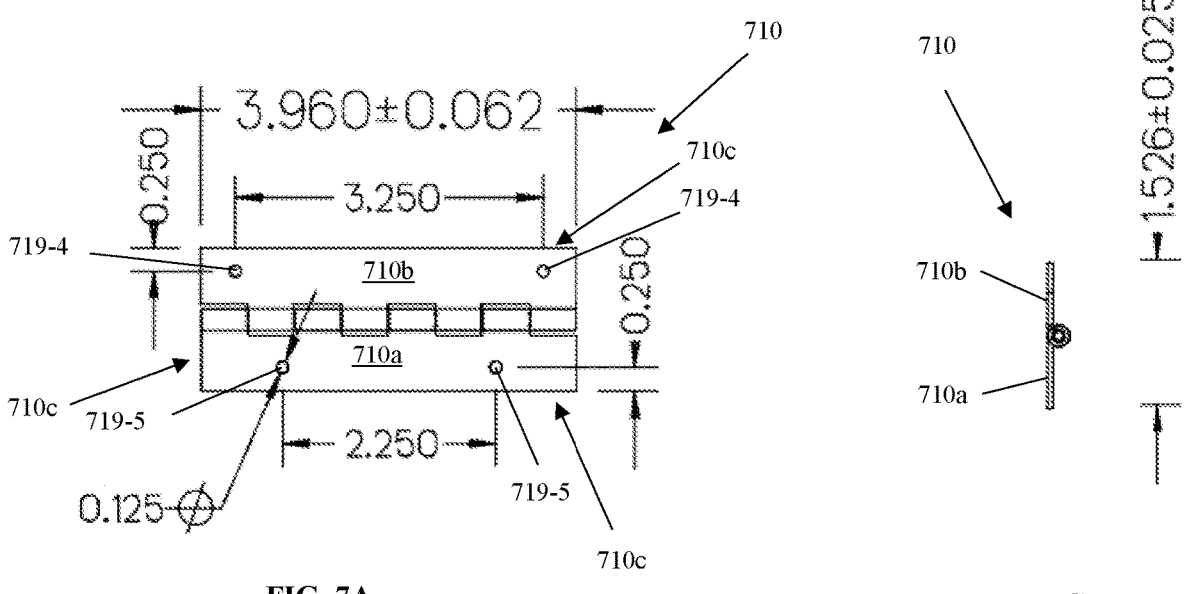
FIG. 7A
FIG. 7B
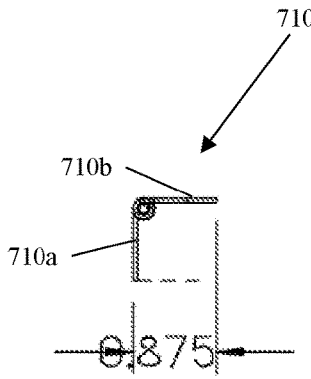
FIG. 7C

PEST TRAP APPARATUS

BACKGROUND OF INVENTION

1. Field of the Invention

The invention relates generally to pest traps and specifically to pest traps configured to autonomously capture pests without requiring a user to reset the pest trap.

2. Description of the Related Art

Pest traps are commonly used for the capture and removal of mice, rats, and other small animals. Said pest traps typically utilize a type of bait to lure in pests and a capturing mechanism configured to trap said pests. This capturing mechanism may utilize either a lethal or non-lethal method to capture the pest, depending on the preference or needs of the user. Regardless of the lethality of the capturing mechanism, pest traps commonly use a mechanical system that is reliant upon the pest physically manipulating an element, such as a pressure plate, in order to access the held bait, thus resulting in the triggering of the capturing mechanism.

One notable limitation of this mechanical capturing mechanism is that it is possible for the pest to obtain the held bait while avoiding triggering the capturing mechanism. Depending on the sensitivity of the triggering mechanism, a conventional trap may be too sensitive and thus triggered by nearby vibrations, and not the pest engaging with the capturing mechanism, thus resulting in the trap activating prematurely, thus failing to capture the pest. In contrast, a conventional trap may not be sensitive enough, thus resulting in the capturing mechanism failing to trigger at all, regardless of engagement with the pest. As such, the reliance of conventional pest traps on purely mechanical structures may have several complications that may hamper their effectiveness. Furthermore, pest traps may also activate prematurely when a user is preparing them, potentially leading to user injury.

Further limitations to conventional pest traps may arise based on the lack of a mechanism to easily reset the pest trap. Upon these traps being triggered, and the pest being captured, a user is often required to take action to reset the trap before it may capture additional pests. This may be time consuming and/or unsanitary for the user, depending on the type of trap. Furthermore, bugs such as fleas and ticks on these pests and diseases carried by these pests may not be contained after capture, as a result of the lack of a suitable containment mechanism.

Therefore, there is a need to solve the problems described above by proving a pest trap apparatus that is configured to capture pests automatically without requiring the pest to physically engage with a trigger and reset autonomously to allow for the capture of additional pests without human intervention.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a pest trap apparatus is provided, the pest trap apparatus comprising: an entry channel having an entry passage, an exit passage, and a channel body disposed between and associated with the entry passage and the exit passage; a trap chamber associated with the entry channel, such that the exit passage is engaged with the trap chamber; a bait cage configured to be engaged with the trap chamber, wherein the bait cage is configured to hold a piece of bait to attract a pest into the trap chamber without allowing the pest to access the piece of bait; a drop cover associated with the trap chamber, the drop cover comprising; a hinge mount engaged with the trap chamber; a bottom jaw engaged with the hinge mount; a trap hinge engaged with the hinge mount; and a trap door engaged with the trap hinge, such that the trap door is pivotally engaged with the hinge mount, wherein the trap door is configured to be selectively rotated on a trap door rotational axis about its pivotal engagement with the trap hinge; a trap latch configured to be selectively engaged with the trap door to prevent rotation of the trap door; a trap chute associated with and disposed below the trap chamber; a sensor associated with the trap chamber, wherein the sensor is configured to generate and transmit a signal upon detecting a pest within the trap chamber; a striker in electrical communication with the sensor, such that the striker is configured to be actuated upon receiving the signal from the sensor, wherein the striker is configured to selectively impact the trap door to facilitate disengagement of the trap door from the trap latch, subsequent downward rotation of the trap door and thus the dropping of the pest within the trap chamber into the trap chute; an actuator configured to be selectively engaged with the trap door to facilitate selective upward rotation of the trap door and reengagement of the trap door with the trap latch; and a shuttle box having a shuttle body and a top jaw engaged with and disposed below the shuttle body, the shuttle box being configured to be nested within the trap chamber and supported by the trap door, such that the selective downward rotation of the trap door drops the shuttle box within the trap chamber, such that the top jaw of the shuttle box is configured to be selectively engaged with the bottom jaw of the drop cover, thus preventing the pest within the trap chamber from returning to the exit passage of the entry channel. Thus, an advantage is that the pest trap apparatus may be configured to autonomously capture pests and reset itself, such that additional pests may be captured afterward. Another advantage is that the striker may be configured to impact or otherwise push the trap door with sufficient force to quickly drop the trap door and the supported shuttle box within the trap chamber, thus allowing pests to be captured quickly before they have a chance to escape. Another advantage is that the sensor may utilize optical devices, such as an infrared tripwire, to actuate the striker and trigger the trap, thus removing the need for a pest to physically manipulate a trap element. Another advantage is that the entry channel may be a tube-like structure, thus exploiting the natural exploration tendencies of smaller pests, while preventing larger pests from entering the trap chamber. Another advantage is that the top jaw and bottom jaw may be configured to break objects that may be disposed between the trap chamber and the entry channel, thus preventing pests within the trap chamber from escaping the trap chamber after the striker is actuated. Another advantage is that the pests may be detained in either a non-lethal or a lethal pest container disposed below the trap chute, thus providing the user with multiple capture options, while preventing bugs or diseases from the pests from escaping the pest container.

In another aspect, a pest trap apparatus is provided, the pest trap apparatus comprising: an entry channel; a trap chamber associated with the entry channel, such that a pest may enter the trap chamber through the entry channel; a drop cover associated with the trap chamber, the drop cover having: a trap door configured to be pivotally engaged with the trap chamber, such that the trap door selectively provides a floor to the trap chamber; a trap latch associated with the trap chamber and configured to be selectively engaged with the trap door; a trap chute associated with and disposed below the trap chamber; a shuttle box configured to be nested within the trap chamber and supported by the trap door; a sensor associated with the trap chamber, the sensor being configured to generate and transmit a signal upon detecting a pest within the trap chamber; and a striker in electrical communication with the sensor, such that upon receiving the signal from the sensor, the striker is configured to impact the trap door to disengage the trap door from the trap latch and rotate the trap door downward; wherein the downward rotation of the trap door is configured to drop the shuttle box within the trap chamber and drop a pest within the trap chamber down into the trap chute disposed below the trap chamber, wherein the dropping of the shuttle box within the trap chamber is configured to prevent pests within the trap chamber from exiting the trap chamber through entry channel. Again, an advantage is that the pest trap apparatus may be configured to autonomously capture pests and reset itself, such that additional pests may be captured afterward. Another advantage is that the striker may be configured to impact or otherwise push the trap door with sufficient force to quickly drop the trap door and the supported shuttle box within the trap chamber, thus allowing pests to be captured quickly before they have a chance to escape. Another advantage is that the sensor may utilize optical devices, such as an infrared tripwire, to actuate the striker and trigger the trap, thus removing the need for a pest to physically manipulate a trap element. Another advantage is that the entry channel may be a tube-like structure, thus exploiting the natural exploration tendencies of smaller pests, while preventing larger pests from entering the trap chamber. Another advantage is that a top jaw associated with the shuttle box and bottom jaw associated with the drop cover may be configured to break objects that may be disposed between the trap chamber and the entry channel, thus preventing pests within the trap chamber from escaping the trap chamber after the striker is actuated. Another advantage is that the pests may be detained in either a non-lethal or a lethal pest container disposed below to trap chute, thus providing the user with multiple capture options, while preventing bugs or diseases from the pests from escaping the pest container.

In another aspect, a pest trap apparatus is provided, the pest trap apparatus comprising: a trap chamber; a drop cover associated with the trap chamber, the drop cover having: a trap door; a trap chute disposed below the trap chamber; a shuttle box configured to be nested within the trap chamber and supported by the trap door; a sensor configured to generate and transmit a signal upon detecting a pest within the trap chamber; and a striker in electrical communication with the sensor, wherein the striker is configured to strike the trap door upon receiving the signal from the sensor, thus dropping the trap door and a pest within the trap chamber into the trap chute and dropping the shuttle box within the trap chamber, thereby preventing the pest within the trap chamber from escaping the trap chamber. Again, an advantage is that the pest trap apparatus may be configured to autonomously capture pests and reset itself, such that additional pests may be captured afterward. Another advantage is that the striker may be configured to impact or otherwise push the trap door with sufficient force to quickly drop the trap door and the supported shuttle box within the trap chamber, thus allowing pests to be captured quickly before they have a chance to escape. Another advantage is that the sensor may utilize optical devices, such as an infrared tripwire, to actuate the striker and trigger the trap, thus removing the need for a pest to physically manipulate a trap element. Another advantage is that a top jaw associated with the shuttle box and bottom jaw associated with the drop cover may be configured to break objects that may be disposed between the trap chamber and the entry channel, thus preventing pests within the trap chamber from escaping the trap chamber after the striker is actuated. Another advantage is that the pests may be detained in either a non-lethal or a lethal pest container disposed below to trap chute, thus providing the user with multiple capture options, while preventing bugs or diseases from the pests from escaping the pest container.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which:

FIGS. 4A-4C illustrate the top plan, side elevation and front elevation views, respectively, of a hinge mount, according to an aspect.

FIGS. 5A-5C illustrate the top plan, front elevation and side elevation views, respectively, of a trap door, according to an aspect.

FIG. 7A illustrates the top plan view of the trap hinge in a flat configuration, according to an aspect.

FIG. 7B illustrates the front elevation view of the trap hinge in a flat configuration, according to an aspect.

FIG. 7C illustrates the front elevation view of the trap hinge in a folded configuration, according to an aspect.

DETAILED DESCRIPTION

Figures 1A, 1B, 1C, 1D, 1E:
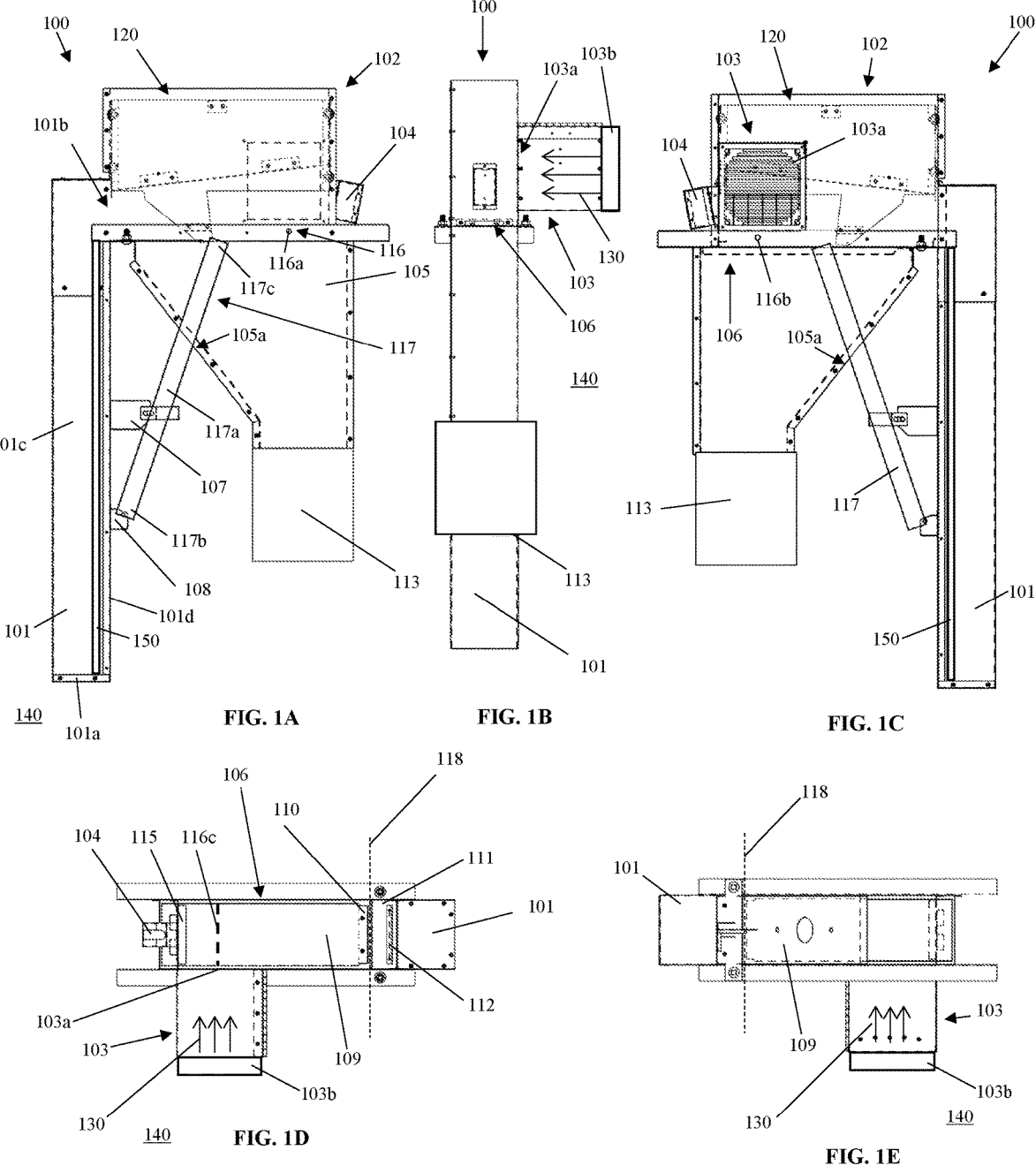
FIGS. 1A-1E illustrate the front cross-sectional, right side cross-sectional, rear cross-sectional, top cross-sectional and bottom cross-sectional views, respectively, of a pest trap apparatus, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 106 and 206, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIGS. 1A-1E illustrate the front cross-sectional, right side cross-sectional, rear cross-sectional, top cross-sectional and bottom cross-sectional views, respectively, of a pest trap apparatus 100, according to an aspect. The pest trap apparatus 100 may be configured to capture one or more pests at a time, and then may autonomously reset itself to capture additional pests, without a need for human intervention. In an embodiment, the pest trap apparatus 100 comprises an entry channel 101, a trap chamber 102 associated with the entry channel 101, a drop cover 106 associated with the trap chamber 102, such that a trap door 109 of the drop cover 106 is configured to selectively provide a floor portion to the trap chamber 102 while in the "ready position", a trap chute 105 disposed below and associated with the trap chamber 102, and a pest container 113 disposed below and associated with the trap chute 105, such that a pest may travel through the entry channel 101 to enter the trap chamber 102 and then subsequently be dropped by the drop cover through the trap chute 105 into the pest container 113 for detainment.

The entry channel 101 may be configured to allow pests to travel from an external environment 140 into the trap chamber 102. In an embodiment, the entry channel 101 comprises an entry passage 101a configured to allow a pest(s) to enter the entry channel 101 from the external environment 140, and an exit passage 101b configured to be engaged with the trap chamber 102 to allow the pest to exit the entry channel 101 into the trap chamber 102, and a channel body 101c disposed between and associated with the entry passage 101a and the exit passage 101b. Upon the pest trap apparatus 100 being triggered, said pest trap apparatus 100 may be configured to prevent the pest(s) from escaping back into the entry channel 101, as will be discussed in greater detail hereinbelow. In an embodiment, the entry channel 101 is made from/comprises square tubing configured to allow pests to enter the trap chamber from the external environment 140, while luring them into the tubing via their natural exploration tendencies and the scent of bait.

Figure 9A:
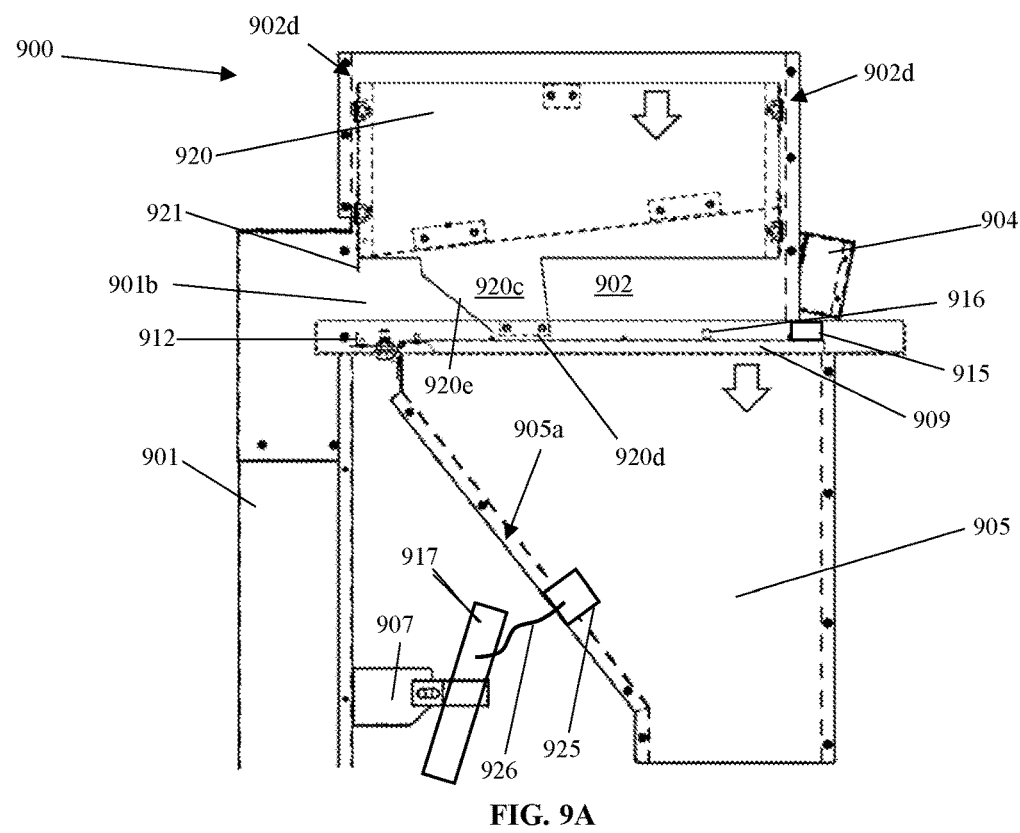
FIG. 9A illustrates the front cross-sectional view of the pest trap apparatus in the "ready position", according to an aspect.
Figure 9B:
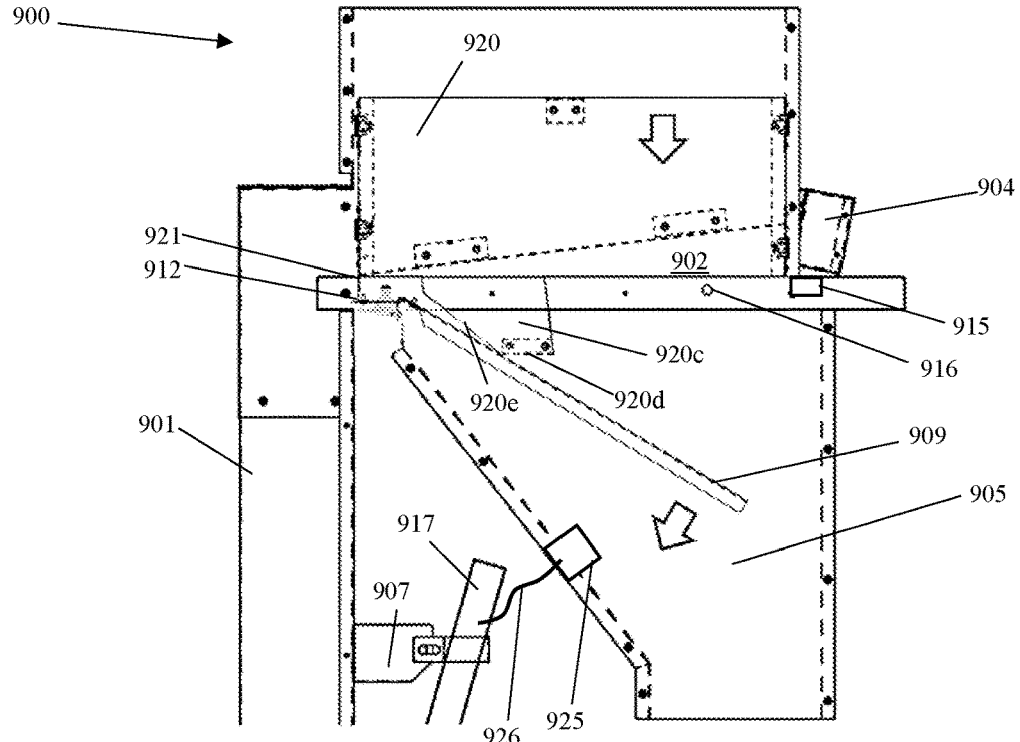
FIG. 9B illustrates the front cross-sectional view of the pest trap apparatus in the "triggered position", according to an aspect.

The trap chamber 102 may contain a variety of different structures that are configured to interconnect and communicate to form a rapidly deployable trapping mechanism that is configured to capture an entering pest before it has a chance to escape. A drop cover 106 may be associated with the trap chamber 102, such that the drop cover 106 may form a "floor" of the trap chamber 102, wherein a trap door 109 of the drop cover 106 is configured to be dropped by an appropriate mechanism, such that the trap door 109 of the drop cover 106 rotates rapidly downward about a pivotal engagement with the trap chamber 102, thus rapidly dropping a pest within the trap chamber 102 down through the trap chute 105 and into a pest container 113 for secure detainment. In an embodiment, the trap door 109 may thusly be disposed between the trap chamber 102 and the trap chute 105 while said trap door 109 is engaged with the trap latch 115. Depending on the lethality of the pest trap apparatus, the pest container 113 may or may not contain a fluid configured to lethally detain pests. It should be understood that the pest trap apparatus 100 may have a "ready position" wherein the trap is prepared to capture a pest, as seen in FIG. 9A, and a "triggered position" wherein the trap is actuated/triggered to capture said pest, as seen in FIG. 9B.

Depending on the application for the pest trap apparatus 100, the pest container 113 may be suitably sized based upon the expected quantity of pests to be captured. For example, for applications requiring the capture of smaller quantities of pests, a 22 quart container may be used as the pest container 113. In contrast, for application requiring the capture of larger quantities of pests, a 55 gallon drum may be used as the pest container 113. Regardless of the size of the pest container 113, it should be understood that the pest container 113 may have a suitably sized and shaped lid portion configured to facilitate secure engagement between the pest container 113 and the trap chute 105, such that pests dropped into the pest container 113 from the trap chute 105 cannot climb out of the pest container 113 to escape back into the trap chute 105 or the external environment 140.

In order to lure pests through the entry channel 101 and into the trap chamber 102, a bait cage 103 containing an appropriate type of bait (not shown) may be engaged with or otherwise associated with the trap chamber 102. This bait cage 103 may be configured to allow the scent of the held bait to proliferate outside of the bait cage 103 and into adjacent areas, including the trap chamber 102. The bait cage 103 may have at least one grill portion 103a that is configured to allow the scent of the held bait to permeate beyond the bait cage 103, while preventing pests from entering the bait cage 103 from any angle or surface, such that the pests cannot access said piece of bait. As a result of the bait within the bait cage 103 being inaccessible to said pest(s), the bait cage 103 may lure in plurality of pests using the same piece of bait, which may only need to be replaced if the piece of bait is no longer capable of luring pests. In an embodiment, a bait fan 103b may be associated with the pest trap apparatus to facilitate more effective propulsion of bait scent, wherein said bait fan 103b may be in electrical communication with a power source and associated with (or in sufficiently close proximity to) the bait cage 103 to facilitate effective scent distribution. In an embodiment, the grill portion 103a may be embedded within a side wall of the trap chamber 102 between the trap chamber 102 and the bait cage 103, such that the scent of the bait within the bait cage 103 may travel from within bait cage 103 into the trap chamber 102.

In an embodiment, the bait fan 103b may be disposed between the bait cage 103 and the external environment 140, such that the operation of the of the bait fan 103b is configured to expel/propel the scent of the bait in a flow direction 130 out of the bait cage 103b into the trap chamber 102, through the entry channel 101 and out into the external environment 140. The bait fan 103b, as well as any other electrically powered element may be powered using a standard electrical power source (e.g., a wall socket). Furthermore, the bait fan 103b may be configured to operate non-stop while the pest trap apparatus is operational to constantly attract pests toward the pest trap apparatus 100.

It should be noted that alternative mechanisms and techniques for luring pests may be used in place of the bait cage 103 containing bait. For example, the bait may be provided within an inaccessible portion within the trap chamber 102, where the pest cannot reach said bait without triggering the trap first. Additionally, materials that are meant to emulate the scent of bait without being bait themselves may instead be utilized to lure pests into the trap chamber 102, wherein a bait scent may be emitted from a scent emitter (not shown) disposed within the trap chamber. However, the bait cage 103 disclosed herein may be preferred for its simplicity, low-waste reusability, and ease of implementation.

In an embodiment, the pest trap apparatus 100 further comprises a striker 104 that is configured to forcefully impact or push the trap door 109, which, as disclosed above, acts as the floor of the trap chamber 102, thus forcing it downward into the trap chute 105 about its pivotal engagement with the trap chamber 102. In an embodiment, the striker 104 may be configured to impact or otherwise push the trap door 109 with sufficient force to disengage it from a trap latch 115 and rotate the trap door 109 fully downward (e.g., to its lowest position) within one tenth of a second. The trap door 109 of the drop cover 106 may be held in a horizontal orientation by a trap latch 115, which itself is associated with the trap chamber 102, while the pest trap apparatus 100 is in a ready position. In an embodiment, the trap door 109 may be configured to selectively engage with the trap latch 115 via magnetic engagement between the trap latch 115 and trap door 109, before the striker 104 is actuated, such that the trap door 109 is not able to rotate freely about its pivotal engagement with the trap chamber 102 while engaged with the trap latch 115. In said embodiment, the trap latch 115 and trap door 109 may be configured to be magnetically engaged with each other with sufficient strength to support a plurality of pests prior to trap actuation, while being further configured to disengage upon the trap door 109 being impacted/pushed by the striker 104. In an embodiment, the trap latch 115 may be a magnetic block of metal configured to selectively magnetically engage with the trap door 109.

In an alternative embodiment, the trap latch 115 may be configured to engage with the trap door 109 through a non-magnetic mechanism, such as by allowing the trap latch 115 to suspend the trap door 109 from below. In other embodiments, alternative structures and devices may be utilized to selectively support the trap door 109 within the trap chamber, as long as said alternative structures and devices may be disengaged from the trap door 109 by the striker 104 and reengaged with the trap door by the actuator 117.

After a corresponding sensor 116, such as an infrared ("IR") tripwire or other optical sensor is triggered/activated/tripped by a pest within the trap chamber 102, the striker 104 may be configured to forcefully impact or otherwise press down on the trap door 109, rapidly rotating the trap door 109 downward and disengaging it from the trap latch 115, thus allowing the trap door 109 to rotate downward, dropping any pest(s) standing on said trap door 109 downward into the trap chute 105 and then the pest container 113. In an embodiment, the sensor 116 may be in electrical communication with the striker 104, wherein the sensor comprises an optical transmitter 116a and an optical receiver 116b configured to be optically aligned with the optical transmitter 116a, such that the movement of a pest between the optical transmitter 116a and the optical receiver 116b "trips" the sensor 116 by blocking an emitted beam 116c, such that the sensor 116 generates and transmits a corresponding signal. It should be understood that the sensor 116 may be engaged with and positioned within, or otherwise associated with the trap chamber 102 such that a pest will need to trip the sensor 116 in order to reach the bait cage 103.

In order to ensure that pests within the trap chamber 102 are not given sufficient time to return into exit passage 101b of the entry channel 101 after the trap door 109 begins dropping, certain auxiliary mechanism may operate in tandem to ensure a rapid trapping mechanism is formed. A first mechanism may come in the form of the previously described striker 104, which may impact the trap door 109 with enough force to disengage it from the trap latch 115 while imparting additional force upon the trap door 109 such that it falls with a speed faster than if it was only influenced by gravity. The trap door 109 may also support a shuttle box 120, which may drop within the trap chamber 102 as the trap door 109 drops, as will be described hereinbelow.

The second mechanism configured to ensure rapid pest capture within the pest trap apparatus 100 may be the shuttle box 120 configured to be nested within the trap chamber 102, such that upon the trap door 109 being rotated downward/dropping by the impact of the striker 104, the shuttle box 120 may rapidly drop within the trap chamber 102, blocking of the exit passage 101b of the entry channel 101, thus further preventing potential escape of the pests from the trap chamber 102 back into the entry channel 101. The dropping of the shuttle box 120 within the trap chamber 102 may also simultaneously drop a shuttle plate, such as shuttle plate 820b of FIG. 8A, of the shuttle box 120 further into the trap chamber 102, effectively causing a "roof" portion of the trap chamber to fall downward, thus further preventing escape of the pest. By having the trap door 109 rotated downward (the "floor" of the trap chamber falling down) and the shuttle box 120 dropping down (the "ceiling" of the trap chamber falling down), the escape of the pest from the trap chamber 102 of pest trap apparatus 100 may be prevented by rapidly dropping the pest into the trap chute 105 while simultaneously blocking off their only escape route back through the exit passage 101*b* of the 101 entry channel. This disclosed trapping mechanism formed from a simultaneous dropping trap door 109 and the falling shuttle box 120 will be described in greater detail hereinbelow.

In order to facilitate the resetting of the trap door 109 of the drop cover 106 after it has been dropped to capture a pest, an actuator 117 may be utilized. In an embodiment, an actuator 117 may be attached to the entry channel 101 by a corresponding actuator mount 107 attached to a central portion 117*a* of the actuator 117 and an actuator pivot 108 attached to a bottom portion 117*b* of the actuator 117, wherein a top portion of 117*c* of the actuator 117 that extends away from the bottom portion of the actuator 117*b* may be configured to selectively engage with the trap door 109, such that extension of the actuator 117 forces the trap door 109 upward about its pivotal engagement with the trap chamber 102, reengaging the trap door 109 with the trap latch 115, thus raising the trap door out of the trap chute 105 and resetting the pest trap apparatus to a "ready position". This returning of the trap door 109 back to its horizontal orientation, as described in the ready position, also forces the shuttle box 120 back upward as well, as a result of the shuttle box 120 being supported by the trap door 109. Upon resetting the trap door 109 and the shuttle box 120 to the configuration consistent to the ready position as seen FIG. 1A-1E, the actuator 117 may selectively disengage from the trap door 109 in a manner that allows the trap door 109 to be forcibly launched downward upon the trap door 109 being impacted by the striker 104, and selectively reengaged with the trap door 109 after the trap door 109 has been dropped to return it to the ready position. It should be understood that that the actuator 117 may travel through an actuator port 105*a* nested within the drop chute 105 in order selectively engage with the trap door 109 as described.

As can be seen in FIGS. 1D-1E, the drop cover 106 may comprise a trap door 109 and a hinge mount 111 pivotally engaged with each other by a trap hinge 110, wherein the hinge mount 111 is further engaged with a bottom jaw 112. In an embodiment, the drop cover 106 may be assembled such that the trap door 109 is configured to rotate about a trap door rotational axis 118 to allow the trap door 109 to rotate accordingly, as described herein. Furthermore, the hinge mount 111 may be configured to engage with the bottom jaw 112 such that upon the dropping of the trap door 109 and subsequent dropping of the shuttle box 120 within the trap chamber 102, the bottom jaw 112 is configured to align with and thus collide into a top jaw disposed on the shuttle box 120, such as top jaw 821 of FIG. 8A, such that the collision of the top jaw with said bottom jaw 112 quickly closes off access to the exit passage 101*b* of the entry channel from within the trap chamber 102. In an embodiment, the top jaw and the bottom jaw 112 may be suitably shaped to split or break objects disposed between the trap chamber 102 and the entry passage 101 that would otherwise prevent the collision of the top jaw and bottom jaw 112 from closing off the exit passage 101*b*. In other words, the engagement/collision of the top jaw with the bottom jaw 112 may be configured to prevent objects disposed between the entry channel 101 and the trap chamber 102 from maintaining communication between the entry channel 101 and the trap chamber 102.

It should be understood that each element of the pest trap apparatus 100 may be made of a suitably durable material to prevent damage from the pests that engage with it, as well as repeated operation. As such, each element of the pest trap apparatus 100 may be made of a durable metal, such as steel, that is configured to resist being broken or damaged from bites of pests, moderate to heavy impacts from pests or other pest trap apparatus elements 100. For example, the bait cage 103 and pest container 113 may be made from a sufficiently strong steel material, such that a pest will not be able to break into the bait cage 103 to access the bait, or break out of the pest container 113 to escape. The pest container 113 may also be made of a sufficiently durable material, such as metal or plastic, to contain not only the pests, but any insects or diseases that said pests may be carrying. In another example, the trap door 109 may also be made of steel, such that the trap door 109 is configured to resist being damaged from repeated impacts by the striker 104. Electrical materials, such as the sensor 116, may be made of electrical components that are well known in the industry.

In an embodiment, a mesh surface 150 may be disposed within and engaged with the entry channel 101 in order to allow pests to more easily travel through the entry channel 101 to enter the trap chamber 102. In said embodiment, said mesh surface 150 may be engaged with an inner wall portion 101*d* of the entry channel 101, have a height consistent with that of the inner wall portion 101*d* and a width of about a half inch to provide pests with a suitable climbing surface to travel up though the entry channel 101. The mesh surface may be configured to engage with the entry channel through the utilization of bolts, or any other suitable fastener, such as clips, snaps, screws etc. It should be understood that other alternative structures may also be utilized to allow pests to more easily access the trap chamber 102 from the external environment 140, such as a ladder or suitably textured pole or surface.

Figure 2A:
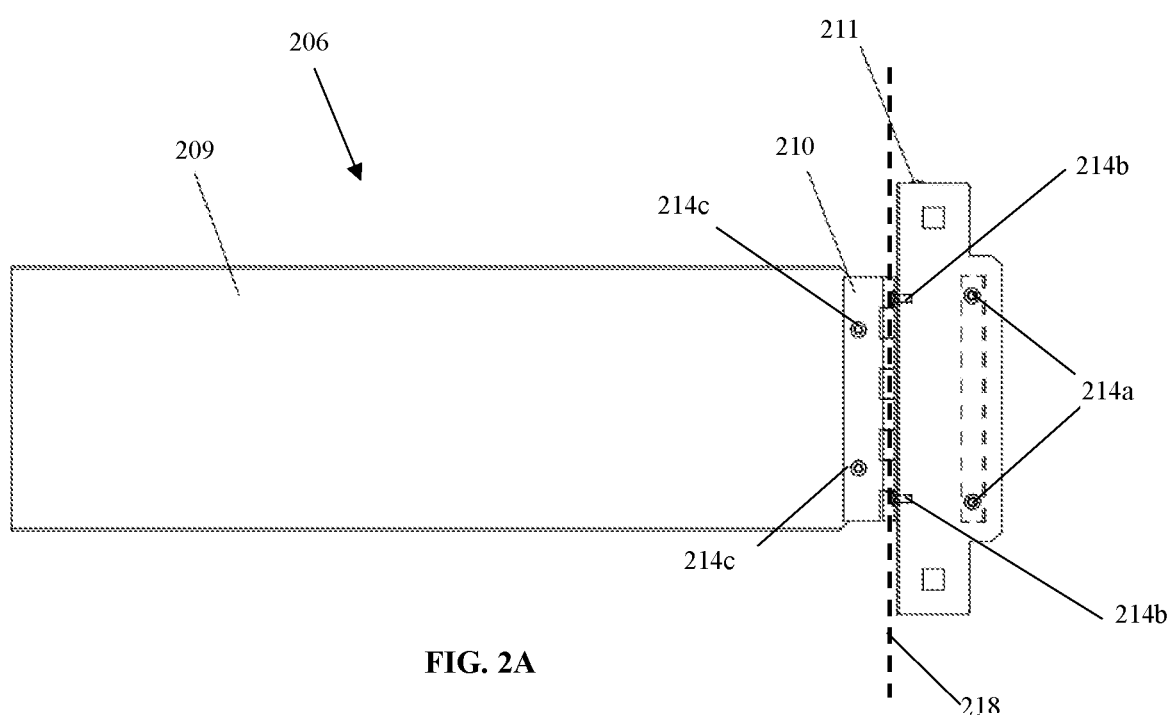
FIGS. 2A-2C illustrate the bottom plan, rear elevation and side elevation views, respectively, of a drop cover of the pest trap apparatus, the drop cover having a plurality of pop rivets, according to an aspect
Figure 2B:
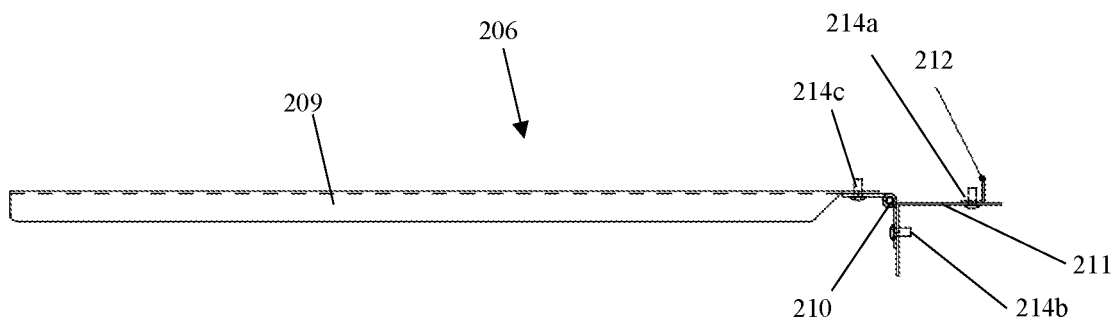
Figure 2C:
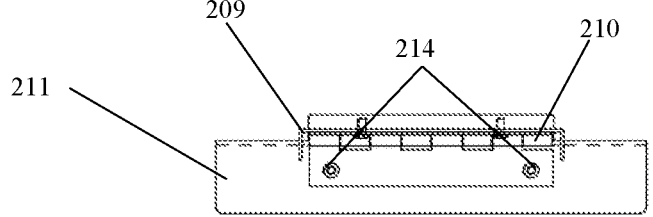

FIGS. 2A-2C illustrate the bottom plan, rear elevation and side elevation views, respectively, of a drop cover 206 of the pest trap apparatus, the drop cover 206 having a plurality of pop rivets 214, according to an aspect. The various elements of the drop cover 206 may be configured to interconnect or otherwise engage with each other through the utilization of pop rivets 214 nested within corresponding rivet ports, as will be discussed in greater detail hereinbelow. In an embodiment, the drop cover 206 comprises a trap door 209 configured to be pivotally engaged with a hinge mount 211 by a trap hinge 210, wherein the trap door 209 is configured to rotate about a trap door rotational axis 218. The hinge mount 211 may be further configured to engage with a bottom jaw 212 as seen in FIG. 2B, in order to facilitate suitable positioning of said bottom jaw 212 within the trap chamber upon engagement of the drop cover 206 with said trap chamber. In an embodiment, a first pair of pop rivets 214*a* may be configured to engage the hinge mount 211 with the bottom jaw 212, a second pair of pop rivets 214*b* may be configured to engage the trap hinge 210 with the hinge mount 211, and a third pair of pop rivets 214*c* may be configured to engage the trap door 209 with the trap hinge 210. The hinge mount 211 may be configured to be irrationally mounted to the trap chamber, whereas the trap door 209 is configured to rotate about its pivotal engagement with hinge mount 211, accordingly.

Figure 3A:
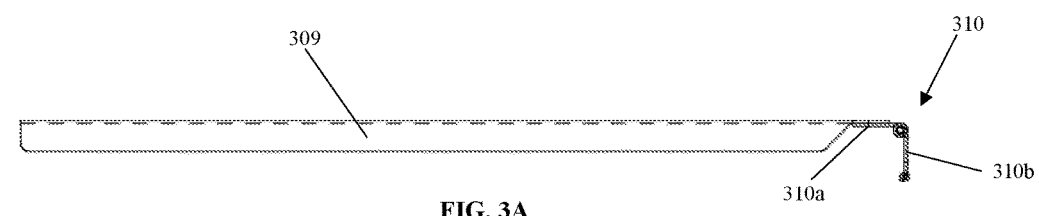
FIG. 3A illustrates the front elevation view of the trap door aligned with the trap hinge, according to an aspect.
Figure 3B:
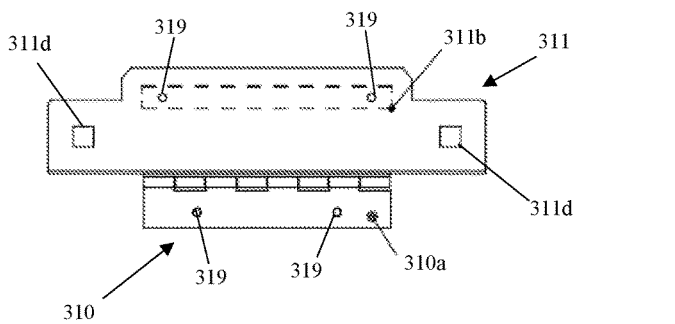
FIG. 3B illustrates the bottom plan view of the trap hinge aligned with the hinge mount, according to an aspect.
Figure 3B:
Figure 3C:
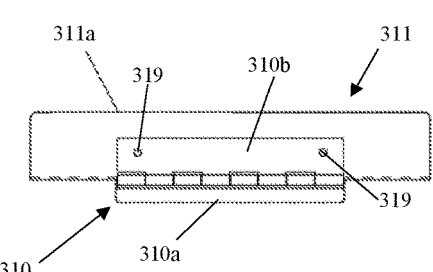
FIG. 3C illustrates the side elevation view of the trap hinge aligned with the hinge mount, according to an aspect.
Figure 3D:
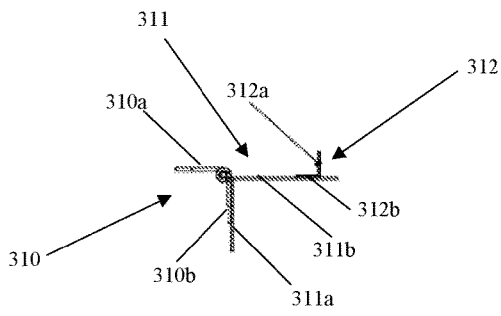
FIG. 3D illustrates the front elevation view of the hinge mount aligned with the trap hinge and the bottom jaw, according to an aspect.

FIG. 3A illustrates the front elevation view of the trap door 309 aligned with the trap hinge 310, according to an aspect. FIG. 3B illustrates the bottom plan view of the trap hinge 310 aligned with the hinge mount 311, according to an aspect. FIG. 3C illustrates the side elevation view of the trap hinge 310 aligned with the hinge mount 311, according to an aspect. FIG. 3D illustrates the front elevation view of the hinge mount 311 aligned with the trap hinge 310 and the bottom jaw 312, according to an aspect. In order to facilitate the interconnection of each drop cover element using pop rivets, as disclosed hereinabove, each drop cover element may have a plurality of rivet ports 319. Each rivet port 319 may be nested within/disposed on an appropriate portion of the corresponding drop cover element to facilitate secure engagement between said elements using corresponding pop rivet. The positioning of each rivet port 319 will be discussed in greater detail hereinbelow.

As can be seen in FIG. 3A, the trap door 309 may be configured to engage with a rotating member 310a of the trap hinge 310. In order to provide a suitable structure for mounting the trap door 309 within the trap chamber, to function as the floor of said trap chamber, a stationary member 310b of the trap hinge 310 may be configured to engage with the hinge mount 311. In order to allow for the trap hinge 310 to provide a pivotal engagement between the hinge mount 311 and trap door 309, the stationary member 310b of the trap hinge 310 may be pivotally engaged with the rotating member 310a of the trap hinge 310. In an embodiment, a pair of rivet ports 319 may be nested within the stationary member 310b to facilitate engagement of the stationary member 310b with the hinge mount 311, whereas another pair of rivet ports 319 may be nested within the rotating member 310a to facilitate engagement of said rotating member 310a with the trap door 309.

The hinge mount 311 may comprise a vertical leg 311a attached horizontal leg 311b, such that a right angle is formed between the vertical leg 311a and the horizontal leg 311b. In an embodiment, a pair of rivet ports 319 may be nested within the horizontal leg 311b to facilitate engagement with the bottom jaw 312, whereas another pair of rivet ports 319 may be nested within the vertical member 311a to facilitate engagement with the stationary member 310b of trap hinge 310, as disclosed hereinabove. The hinge mount 311 may further comprise a pair of securing ports 311d, wherein a corresponding rivet or other suitable screw, bolt, etc., may be configured to be nested within each securing port 311d to secure the hinge mount 311 to the trap chamber.

The bottom jaw 312 may comprise a bottom plate 312b and a top plate 312a attached to a bottom plate 312b. In an embodiment, the top plate 312a may form a right angle with the bottom plate 312b, such that the top and bottom plates are perpendicular to each other. The bottom jaw 312 may further comprise a pair of rivet ports 319 nested within the bottom plate 312b which are configured to facilitate engagement with the horizontal leg 311b of the hinge mount 311.

It should be understood that each pair of rivet ports 319 disposed on each portion of each drop cover element, including the trap door 309, trap hinge 310, hinge mount 311 and bottom jaw 312, may be complementarily sized and positioned to facilitate engagement between adjoining drop cover elements. For example each rivet port 319 nested within the bottom plate 312b may be configured to coaxially align with a corresponding rivet port 319 nested within the horizontal leg 311b, such that a corresponding pop rivet, such as a pop rivet of first pair of pop rivets 214a of FIG. 2B, may be configured to nest within the coaxially aligned rivet ports 319 of the hinge mount 311 and the bottom jaw 312. This may be comparable for the other engagements between drop cover elements, as will be discussed in greater detail hereinbelow.

FIGS. 4A-4C illustrate the top plan, side elevation and front elevation views, respectively, of a hinge mount 411, according to an aspect. The hinge mount 411 may be configured to be engaged with the trap chamber to secure the drop cover to the trap chamber, wherein the hinge mount 411 may comprise a vertical leg 411a attached to a horizontal leg 411b, such that a right angle may be formed between said legs 411a, 411b. It should be understood that any measurements provided herein are provided as examples, and thus should not be interpreted as limiting the potential sizing specifications for each element. A second pair of rivet ports 419-2 may be nested within a narrow portion 411e of the horizontal leg 411b. In an embodiment, said second pair of rivet ports 419-2 nested within the horizontal leg 411b may be separated by a distance of about 3.350 inches, from center to center, wherein the narrow portion 411e of the horizontal leg 411b may have a width of about 4.650 inches. In an embodiment, a pair of securing ports 411d nested within a wide portion 411f the horizontal leg 411b may have a square shape with a length (and width) of about 0.330 inches, wherein a center point of each securing port 411d is about 0.563 inches from a nearest lateral end 411g of the wide portion 411f. In an embodiment, a wide portion 411f of the horizontal leg 411b may have a length of about 1.180 inches. Furthermore, the horizontal leg 411b may have a total length of about 1.700 inches, which includes the combined lengths of the adjoined narrow portion 411e and wide portion 411f. In an embodiment, the narrow portion 411e and the wide portion 411f may form a unified, monolithic horizontal leg 411b.

In an embodiment, the vertical leg 411a of the hinge mount 411 may have a width of about 7 inches and a height of about 1.180 inches. In an embodiment, a third pair of rivet ports 419-3 nested within the vertical leg 411a may be separated by a distance of about 3.250 inches, from center to center. It should be understood that each rivet port described herein for any element may have a circular shape with a diameter about 0.125 inches, wherein each rivet may be configured to be snuggly secured within said rivet ports, regardless of the element(s) they are nested within.

FIGS. 5A-5C illustrate the top plan, front elevation and side elevation views, respectively, of a trap door 509, according to an aspect. In an embodiment, the trap door 509 may comprise a door body 509a, a door end 509b attached to and parallel with the door body 509a and two vertical door plates 509d attached to and perpendicular to the door body 509a. The trap door 509 on may have a total length of about 14.065 inches and total width of about 4.300 inches, wherein the door end 509b itself has a length of about 0.567 inches and a width of about 4.000 inches. A sixth pair of rivet ports 519-6 nested within the door end 509b may be separated by about 2.250 inches, from center to center. The center of each rivet port 519-6 may be separated from the terminal side 509e of the door end 509b by about 0.330 inches. The height of each vertical door plate 509d may be about 0.500 inches. The separation between the sixth pair of rivet ports 519-6 disposed on the door end 509b may be consistent with that of a corresponding pair of rivet ports on the trap hinge, such as the fifth pair of rivet ports 719-5 nested within the trap hinge 710 of FIGS. 7A, as will be disclosed in greater detail hereinbelow.

Figure 6A:
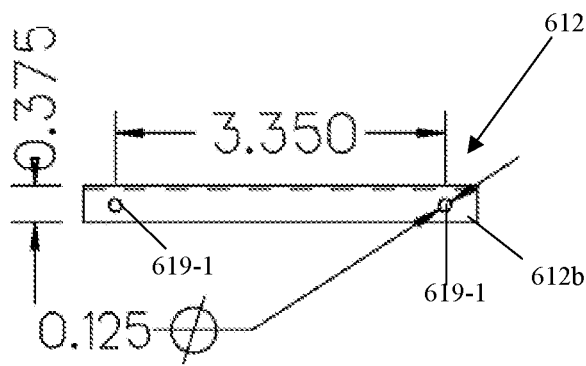
FIGS. 6A-6C illustrate the top plan, side elevation and front elevation views, respectively, of a bottom jaw, according to an aspect.
Figure 6B:
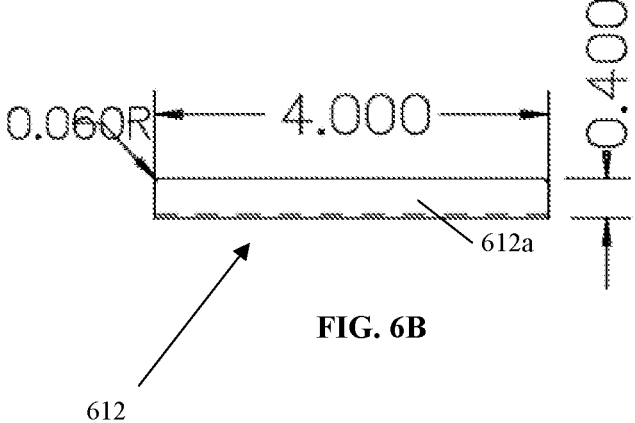
Figure 6C:
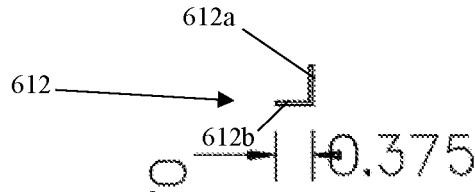

FIGS. 6A-6C illustrate the top plan, side elevation and front elevation views, respectively, of a bottom jaw 612, according to an aspect. In an embodiment, the bottom jaw 612 may comprise a plate 612b and a top plate 612a attached to a bottom plate 612b, such that a right angle is formed between the top plate 612a and the bottom plate 612b. In an embodiment, a first pair of rivet ports 619-1 nested within the bottom plate 612b may be separated by a distance of about 3.350 inches, from center to center. The separation distance between the first pair of rivet ports 619-1 on the bottom plate 612b may be equivalent to the separation distance between the second pair of rivet ports 419-2 nested within the horizontal leg 411*b* of the hinge mount 411 of FIG. 4A, thus allowing a first pair of pop rivets, such as first pair of pop rivets 214*a* of FIG. 2A, to be nested within each corresponding pair of rivet ports to secure the bottom jaw 612 to the hinge mount 411 of FIGS. 4A-4C. The bottom jaw 612 may have a total length of about 0.375 inches, a total height of about 0.400 inches, and a width of about 4.000 inches.

FIG. 7A illustrates the top plan view of the trap hinge 710 in a flat configuration, according to an aspect. FIG. 7B illustrates the front elevation view of the trap hinge 710 in a flat configuration, according to an aspect. FIG. 7C illustrates the front elevation view of the trap hinge 710 in a folded configuration, according to an aspect. The trap hinge 710 may comprise a rotating member 710*a* pivotally engaged with a stationary member 710*b*. In an embodiment, each member 710*a*, 710*b* may have a length of about 0.875 inches, wherein the pivotal engagement of the members 710*a*, 710*b* results in a total hinge length of about 1.526±0.025 inches. In said embodiment, each member 710*a*, 710*b* may have a width of about 3.960±0.062 inches, wherein the total width of the trap hinge 710 is also about 3.960±0.062 inches, as a result of the members 710*a*, 710*b* being joined about their length, as seen in FIG. 7A. The separation between the center of each rivet port of each rivet pair 719-4, 719-5 and the terminal end 710*c* of its corresponding member 710*a*, 710*b* may be about 0.250 inches, as seen in FIG. 7A.

It should be understood that while the characteristics of each rivet port, such as their size, shape, separation from other rivet ports within a corresponding element, etc., may be varied, each rivet port on each drop cover element may need to be positioned such that it is configured to coaxially align with a corresponding complementary rivet port nested within a corresponding portion of an engaged element. The spacing examples for each pair of rivet ports disclosed in FIG. 4A-7C illustrate this aspect. For the following description, it should be understood that "alignment" of a first pair of rivet ports with a corresponding second pair of rivet ports indicates that each rivet port of the first pair of rivet ports is configured to be coaxially aligned with a corresponding rivet port of the second pair of rivet ports.

In order to facilitate the engagement of each member 710*a*, 710*b* with a corresponding structure of the drop cover, the separation between the rivet ports of a fifth pair of rivet ports 719-5 nested within the rotating member 710*a* may differ from the separation between the rivet ports of a fourth pair of rivet ports 719-4 nested within the stationary member 710*b*. In an embodiment, the separation distance between the rivet ports of a fourth pair of rivet ports 719-4 may be about 3.250 inches, from center to center. In an embodiment, the separation distance between the fifth pair of rivet ports 719-5 of the rotating member 710*a* may be about 2.250 inches, and equivalent to the separation distance between the sixth pair of rivet ports 519-6 of the trap door 509 of FIG. 5A, thus facilitating engagement of the trap door 509 of FIG. 5A with the rotating member 710*a* of the trap hinge 710 using a third pair of pop rivets, such as third pair of pop rivets 214*c* of FIGS. 2A-2B.

As described above, in an embodiment, the separation distance between the rivet ports of the fourth pair of rivet ports 719-4 may be about 3.250 inches, from center to center. The separation distance between the fourth pair of rivet ports 719-4 of the stationary member 710*b* may be equivalent to the separation distance between the third pair of rivet ports 419-3 nested within the vertical leg 411*a* of the hinge mount 411 of FIG. 4B, thus facilitating the engagement of the trap hinge 710 with said hinge mount through the utilization of a second pair of pop rivets, such as second pair of pop rivets 214*b* of FIGS. 2A-2B.

As can be recognized from the example specifications of FIGS. 4A-7C, as well as assembled drop cover 206 of FIG. 2A-2C, the sixth pair of rivet ports 519-6 on the trap door 509 of FIG. 5A may be configured to align with the fifth pair of rivet ports 719-5 on the trap hinge 710 and be engaged with each other using a third pair of pop rivets, such as third pair of rivet ports 214*c* of FIG. 2A. Additionally, The fourth pair of rivet ports 719-4 on the trap hinge 710 may be configured to align with the third pair of rivet ports 419-3 on the hinge mount 411 of FIG. 4B and be engaged with each other by a second pair of pop rivets, such as second pair of pop rivets 214*b* of FIG. 2A. Furthermore, the second pair of rivet ports 419-2 on the hinge mount 411 of FIG. 4A may be configured to align with the first pair of rivet ports 619-1 on the bottom jaw 612 of FIG. 6A and be engaged with each other by a first pair of rivet ports, such as first pair of rivet ports 214*a* of FIG. 2A. The hereinabove described configuration of the drop cover may allow it to achieve the necessary functionalities to ensure proper pest trap apparatus function.

FIGS. 8A-8E illustrate the front elevation, left side elevation, right side elevation, top plan, and bottom plan views, respectively, of a shuttle box 820 configured to be nested within the trap chamber, according to an aspect. As disclosed hereinabove, a shuttle box 820 nested within the trap chamber of the pest trap apparatus, such as trap chamber 102 of pest trap apparatus 100 of FIG. 1, may be supported by the trap door of the drop cover, and thus, selectively dropped as the trap door falls when the pest trap apparatus is triggered. The shuttle box 820 may comprise a shuttle body 820*a* and a shuttle plate 820*b* secured to the shuttle body 820*a* by a plurality of shuttle brackets 823. The shuttle plate 820*b* may function as the "ceiling" of the trap chamber, wherein said ceiling of the trap chamber is configured to fall downward as the trap door, such as trap door 209 of FIG. 2A, falls.

In an embodiment, the shuttle plate 820*b* may be attached to the shuttle body 820*a* at an angle, wherein the left side of the shuttle plate 820*b* is attached to the shuttle body 820*a* at a lower height than the right side of the shuttle plate 820*b*. This angled shuttle plate 820*b* may help ensure that pests within the trap chamber are forced away from the exit passage of the entry channel, such as exit passage 101*b* of entry channel 101 of FIG. 1A, and downward into the trap chute, such as entry channel 101 and trap chute 105 of FIG. 1, rather than potentially crushing them between the trap door and the shuttle box 820 as the shuttle box 820 descends. As such, the shuttle plate 820*b* may be configured to further prevent pests from escaping the trap chamber after the pest trap apparatus is triggered.

Figure 8A:
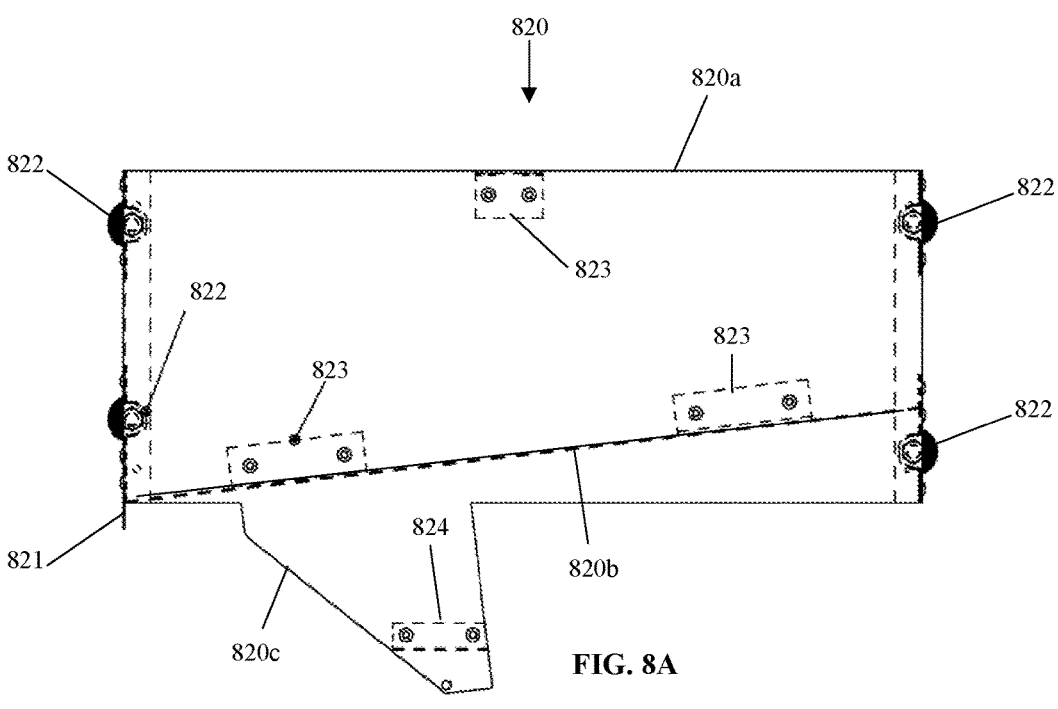
FIGS. 8A-8E illustrate the front elevation, left side elevation, right side elevation, top plan, and bottom plan views, respectively, of a shuttle box configured to slidably nested within the trap chamber, according to an aspect.
Figure 8B:
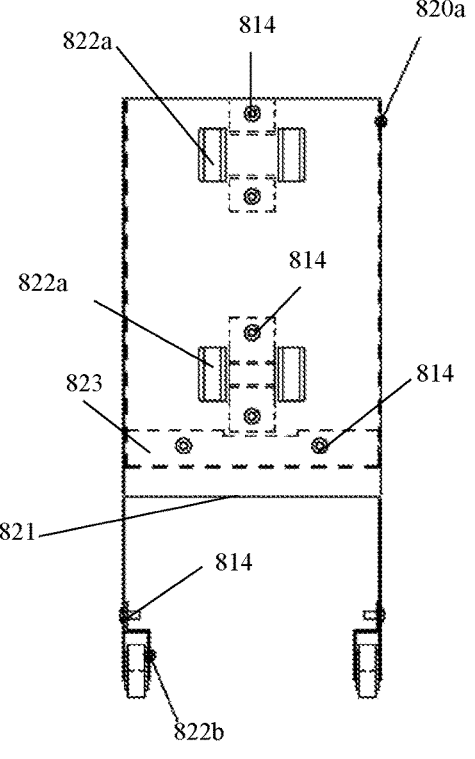
Figure 8C:
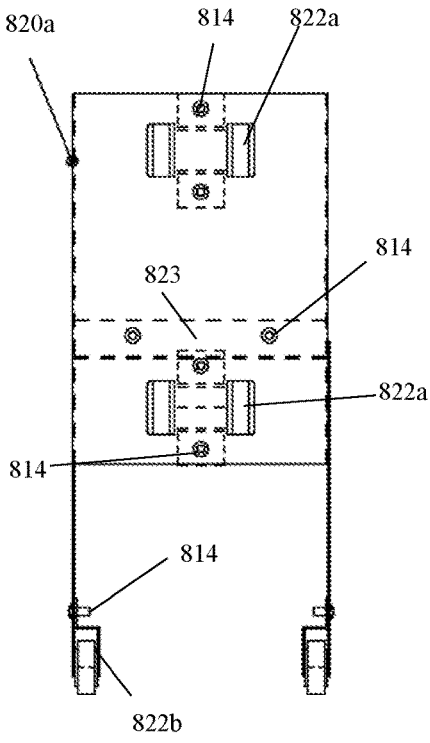
Figure 8D:
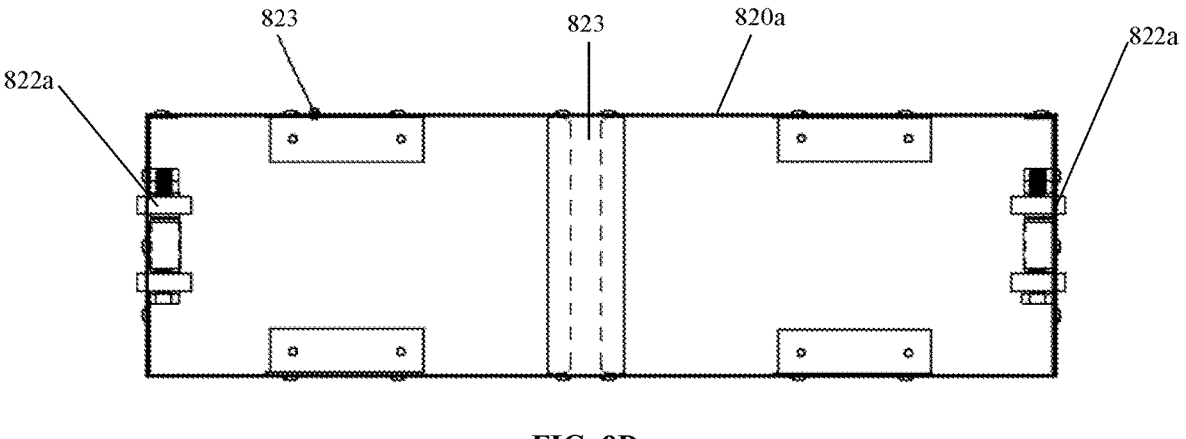
Figure 8E:
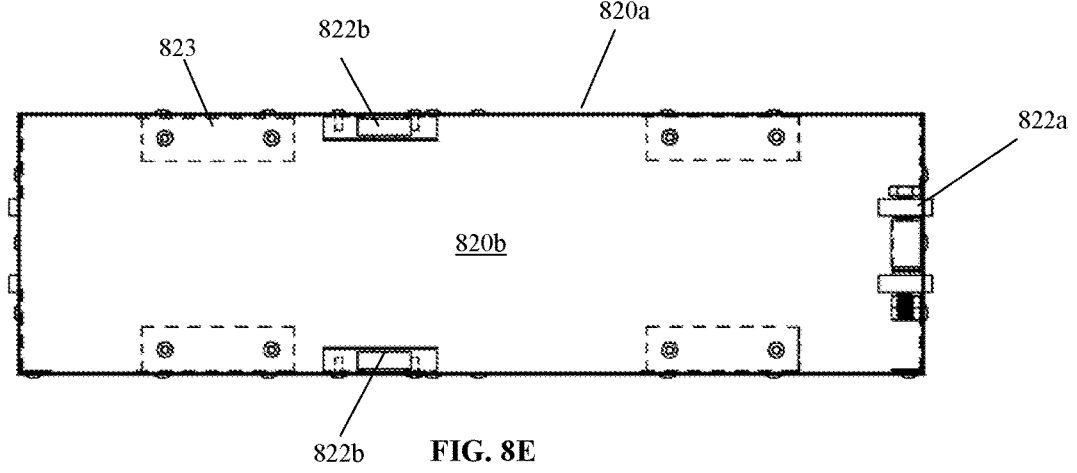

The shuttle box 820 may further comprise a shuttle support 820*c* engaged with and disposed below the shuttle body 820*a*. As seen in FIG. 8A, a support bracket 824 may be secured to the shuttle support 820*c* to allow the shuttle box 820 to maintain a suitable elevation within the trap chamber by resting upon the trap door while the pest trap apparatus is in the ready position, to allow pests to enter the trap chamber before the pest trap apparatus is triggered. A pair of support rollers 822*b* may be secured to the shuttle support 820*c* by said support bracket 824 and configured to rest on the trap door in order to ensure the shuttle box 820 drops smoothly and quickly as the trap door drops by allowing the support rollers 822*b* to roll down the trap door as it descends. It should be understood that the support rollers 822*b* may also be configured to allow the shuttle box 820 to roll back up within the trap chamber smoothly as the actuator returns the trap door to the ready position, as the support rollers 822*b* may be configured to ensure smooth movement of the shuttle box 820 for all changes of elevation.

In order to further ensure the smooth and rapid dropping of the shuttle box 820 after the pest trap apparatus has been triggered and the trap door begins to drop, a plurality of wall rollers 822*a* may be nested within the shuttle body to allow the shuttle body 820*a* to roll smoothly down the vertical walls of the trap chamber, such as vertical walls 902*d* of FIG. 9A, as the shuttle box 820 drops, thus ensuring that the shuttle box 820 does not get stuck or jammed as it descends. Each wall roller 822*a* may be rotationally secured to the shuttle body 820*a* by a corresponding shuttle bracket 823, such that each wall roller 822*a* rotates smoothly as the shuttle box 820 descends within the trap chamber.

As can be seen in FIG. 8A-8E, each shuttle bracket 823 and support bracket 824 may be secured to a corresponding structure, such as the shuttle body 820*a* or shuttle support 820*c*, by suitable engagement method. In an embodiment, each shuttle bracket 823 may be secured to the shuttle body 820*a* by a corresponding pair of pop rivets 814 comparable to those disclosed hereinabove, whereas the support bracket 824 may also be secured to the shuttle support 820*c* by a corresponding pair of pop rivet 814. Furthermore, each wall roller 822*a* and support roller 822*b* may be secured to the shuttle body 820*a* and the shuttle support 820*c*, respectively, in such a way that each roller 822*a*, 822*b* may roll freely, and thus facilitate the smooth travel of the shuttle box within the trap chamber as the pest trap apparatus is triggered and subsequently reset. In an embodiment, each roller 822*a*, 822*b* may be secured to the shuttle box by a suitable clasp or bracket that enables selective rolling as necessitated by the rollers 822*a*, 822*b*.

As described hereinabove, the shuttle box 820 may further comprise a top jaw 821 engaged with and disposed below the shuttle body 820*a*. The top jaw 821 may be configured to collide with the bottom jaw, such as bottom jaw 212 of drop cover 206 of FIG. 2B, when the pest trap apparatus is triggered and the shuttle box 820 drops to its lowest position within the trap chamber. As disclosed hereinabove, the collision of the top jaw 821 of the shuttle box with the bottom jaw of the drop cover ensures that the exit passage of the entry channel is rapidly closed off, while breaking objects from that would otherwise prevent the closing off of the exit passage. In an embodiment, debris left by a pest within the pest trap apparatus between the exit passage and the trap chamber, such as exit passage 101*b* and trap chamber 102 of FIG. 1A, may be sliced, severed or otherwise removed from between the top jaw and bottom jaw, thus ensuring the communication between the exit passage 101*b* and the trap chamber 102 is broken/disrupted and thus the pest within the trap chamber 102 cannot escape back into the exit passage 101*b* after the pest trap apparatus 100 has been triggered. In an embodiment, the pest trap apparatus may be "triggered" the instant that a pest within the trap chamber trips a corresponding sensor, and thus triggers the striker, as will be described in greater detail hereinbelow.

FIG. 9A illustrates the front cross-sectional view of the pest trap apparatus 900 in the "ready position", according to an aspect. FIG. 9B illustrates the front cross-sectional view of the pest trap apparatus 900 in the "triggered position", according to an aspect. As can be seen in FIGS. 9A-9B, the triggering of the pest trap apparatus 900 may result in the simultaneous movement of various elements of the pest trap apparatus 900. It should be understood that any suitable detection apparatus/sensor may be used to detect a pest within the trap chamber 902, and thus transition the pest trap apparatus from the "ready position" depicted in FIG. 9A to the "triggered position" depicted in FIG. 9B. In an embodiment, the sensor 916 may be an infrared tripwire having an optical transmitter and an optical receiver configured to be optically aligned with optical transmitter. As is understood, the infrared tripwire may detect the presence of a pest within the trap chamber, and thus be triggered, when said pest moves in between the optical transmitter and the optical receiver, thereby preventing the emitted beam from reaching the optical receiver. Upon the detection of the pest by the sensor, said sensor 916 may be configured to send an electrical signal to the striker 904 to impact the trap door 909, thus disengaging the trap door 909 from the trap latch 915 and forcing the trap door 909 to rotate downward, as seen in FIG. 9B, dropping any pests within the trap chamber 902 into the trap chute 905.

It should be understood that the pest trap apparatus 900 may be configured to be "triggered" by the pest(s) being detected by a sensor 916 (e.g., tripping an infrared tripwire) within the trap chamber 902, thus resulting in the actuation of the striker 904, which impacts and drops the trap door 909 of the drop cover. As described hereinabove, the shuttle box 920 may be configured to rest upon said trap door 909, such that when the trap door 909 drops, the shuttle box 920 falls downward within the trap chamber as well. As disclosed hereinabove, wall rollers disposed on the shuttle box, such as wall rollers 822*a* of FIG. 8A, may be configured to roll smoothly down the vertical walls 902*d* of the trap chamber 902, whereas support rollers, such as support rollers 822*b*, may be configured to roll smoothly on the trap door as it rotates. The shuttle box 920 may stop falling when it reaches a fully dropped position, wherein the top jaw 921 of the shuttle box 920 is engaged with the bottom jaw 912 of the drop cover. As disclosed hereinabove, the impact and subsequent engagement of the top jaw 921 with the bottom jaw 912 may prevent pests from escaping back into exit passage 901*b* the entry channel 901.

In an embodiment, the shuttle support 920*c* may be shaped such that a flat portion 920*d* of said shuttle support 920*c*, or more specifically, support rollers engaged with the flat portion 920*d*, are configured to rest upon the trap door 909 while the pest trap apparatus 900 is in the ready position of FIG. 9A, whereas an angled portion 920*e* of said shuttle support is configured to rest upon the trap door while the pest trap apparatus 900 is in the triggered position of FIG. 9B. In an embodiment, the aforementioned pair of support roller, such as support rollers 822*b* of FIG. 8B, may be pivotally engaged with the flat portion 920*d* of the shuttle support, such that said support rollers are configured to be supported by and roll smoothly on the trap door 909 as the trap door 909 drops to the triggered position, as seen in FIG. 9B, and as the trap door 909 is returned to the ready position of FIG. 9A. It should be understood that the shuttle support 920*c* and other shuttle box elements may form a monolithic structure, wherein shuttle support 920*c* (and thus the flat portion 920*d* and angled portion 920*e* of the shuttle support 920*c*), as well as the aforementioned shuttle body 820*a* and shuttle plate 820*b* of FIG. 8A, may formed a single unified shuttle box 920, wherein each set of rollers is configured to be pivotally engaged with the corresponding structure of the shuttle box 920 as disclosed herein.

After the pest trap apparatus 900 has been triggered, and the trap door 909 of the drop cover has been dropped, such that the shuttle box 920 falls and any pests within the trap chamber 902 are dropped down into the trap chute 905, the pest trap apparatus 900 may also be configured to be reset back to the ready position of FIG. 9A through the utilization of the provided actuator 917. As disclosed hereinabove, an actuator attached to an actuator mount 907 may be configured to selectively force the trap door 909 upward from the triggered position back to the ready position by reengaging the trap door 909 with the trap latch 915. In an embodiment, the actuator 917 may be configured to selectively extend to rotate the trap door 909 upward, such that the trap door is reengaged with and/or supported by the trap latch 915, thus forcing the supported shuttle box 920 to move upward as well. In an embodiment, the actuator 917 may also be configured to return the striker 904 from its triggered position to its ready position as well, as will be discussed in greater detail hereinbelow. It should be understood that while the actuator 917 may be configured to forcibly rotate the trap door 909 upward back into the ready position, the actuator 917 may also be configured to selectively retract to allow the trap door 909 to return back to the triggered position after said trap door 909 is impacted by the striker 904.

As disclosed hereinabove, the actuator 917 may be configured to engage with the trap door 909 while returning it to the ready position (e.g., reengaging the trap door 909 with the trap latch 915) and disengage from the trap door 909 after said actuator 917 returns the trap door 909 to the ready position. In order to facilitate the automatic resetting of the trap door 909 from the triggered position of FIG. 9B to the ready position of FIG. 9A, a trap door reset switch 925 may be seated within or otherwise associated within the trap chute 905. In an embodiment, the trap door reset switch 925 may be seated within and engaged with the trap chute 905 such that said trap door reset switch 925 is disposed about two inches below the actuator port 905a nested within the drop chute 905. As such, the trap door reset switch 925 may be positioned within the trap chute 905 such that when the trap door 909 is impacted by the striker 904 and subsequently drops, rotating downward into the trap chute 905, that the trap door 909 collides with or otherwise engages with the trap door reset switch 925.

In an embodiment, the trap door reset switch 925 may be a magnetic switch or metal detector that is configured to be actuated upon engagement/contact with the trap door 909. The trap door reset switch 925 may be in electrical communication with the actuator 917, such as through reset switch wire 926, such that upon the trap door 909 engaging with the trap door reset switch 925, the actuator 917 is configured to extend upward, thus selectively engaging with the trap door 909 and selectively rotating said trap door 909 back upward into the ready position of FIG. 9A. Upon reaching the fully extended actuator position, as shown by actuator 117 of FIG. 1A, wherein the trap door 909 is reengaged with the trap latch 915, the actuator 917 may disengage from the trap door 909 and return to the withdrawn configuration shown in FIGS. 9A-9B. In an embodiment, the trap door reset switch may be ¼ inch long and ¼ inch wide.

The pest trap apparatus 900 may be configured to only require a limited amount of power while on standby (e.g., while not being actively triggered/reset). In an embodiment, the pest trap apparatus 900 may be configured to use 200 mA (at 12 volts) while on standby, making it ideal for solar powered systems, causing minimal power drain while on standby. In said embodiment, when the pest trap apparatus 900 is triggered, said pest trap apparatus 900 may be configured to use 12 volts and low amps (e.g., 1-1.5 A) for 4 seconds, as it strikes and drops the trap door 909 and then resets the trap door 909 to the ready position.

It should be understood that modifications may be made to various elements of the disclosed pest trap apparatus 900 in order to facilitate proper function in different environments. In an alternative embodiment, the pest trap apparatus may be configured to function properly in low gravity environments with slight modifications to the pest container, such as pest container 113 of FIG. FIG. 1A, by lining the inner surface of the pest container with an adhesive material. Said embodiment of the pest trap apparatus may be configured to remain operable in environments having a gravity as low as 1.42 m/s², thus making this trap ideal for use on a space station. In said alternative, lower gravity embodiments, the pest trap apparatus may be suitably modified to facilitate proper trap function by providing sufficient downward force on the shuttle box 920 to help drop the shuttle box consistently after said trap door 909 is impacted by the striker 904, as will be described in greater detail in FIG. 11A-11B.

Figures 10A, 10B:
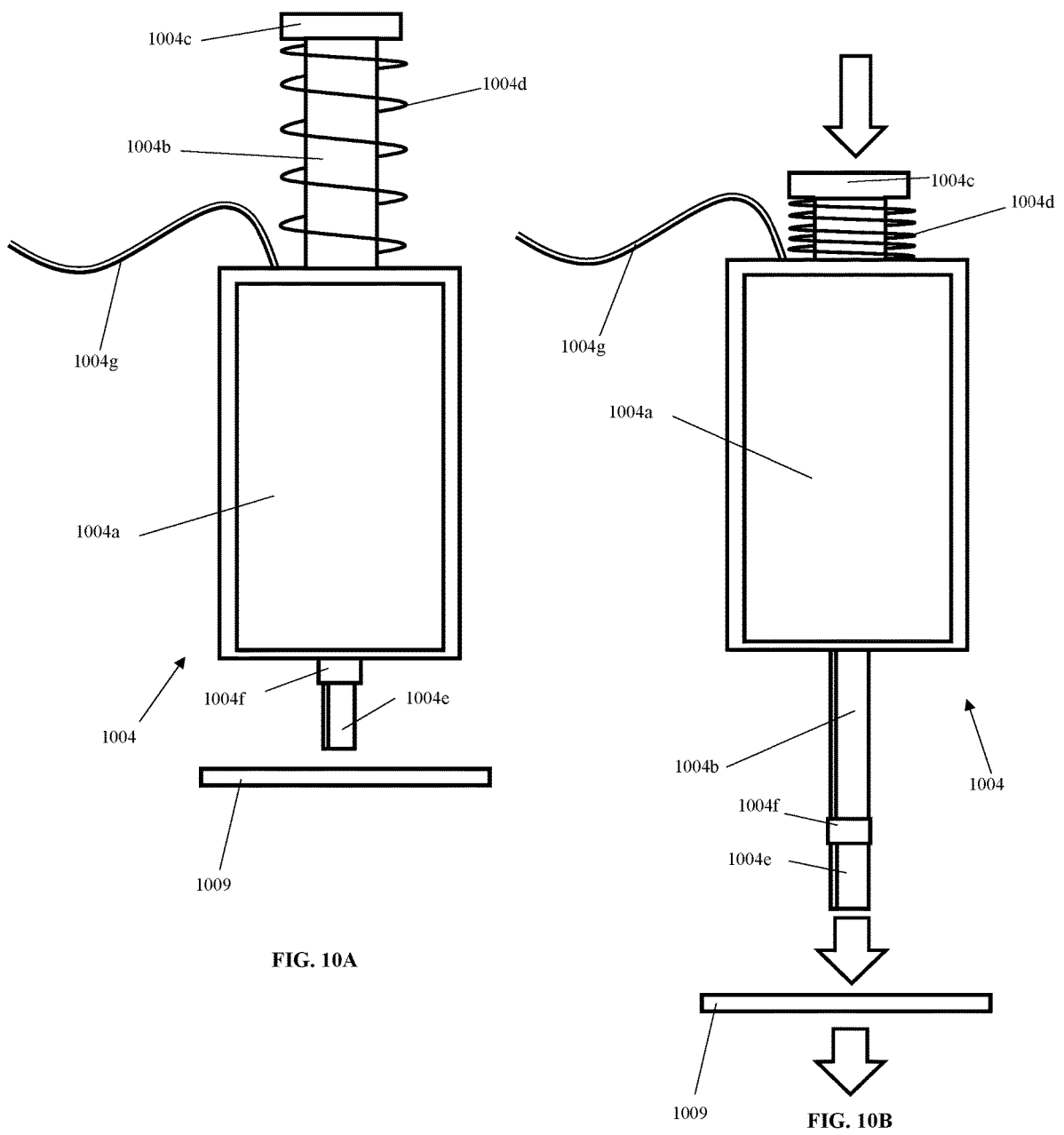
FIG. 10A illustrates the side perspective view of a striker in the "ready position", according to an aspect.
FIG. 10B illustrates the side perspective view of a striker in the "triggered position", according to an aspect.

FIG. 10A illustrates the side perspective view of a striker 1004 in the "ready position", according to an aspect. FIG. 10B illustrates the side perspective view of a striker 1004 in the "triggered position" impacting a trap door 1009, according to an aspect. As disclosed hereinabove, in order to facilitate the transitioning of the pest trap apparatus from the ready position to the triggered position to allow for the capture of pest, a striker 1004 may be utilized to selectively manipulate the trap door 1009 disposed beneath it. The striker 1004 may be mounted to the trap chamber, such the striker 1004 is suitably positioned to impact the trap door 1009 to facilitate downward rotation/dropping of the trap door 1009 as disclosed hereinabove.

In an embodiment, the striker 1004 comprises a striker body 1004a, a striker arm 1004b partially nested within or otherwise associated with the striker body 1004a, a striker cap 1004c engaged with the striker arm 1004b and disposed above the striker body 1004a, and a striker spring 1004d surrounding a corresponding portion the striker arm 1004b such that said striker spring 1004d is disposed between the striker cap 1004c and the striker body 1004a. The striker spring 1004d may be suitably compressed between the striker cap 1004c and the striker body 1004a while the striker 1004 is in the triggered position of FIG. 10B, and relaxed (i.e., allowed to assume its natural extension) while the striker 1004 is in the ready position of FIG. 10A. The striker 1004 may be configured such that the energy stored within the compressed striker spring 1004d of the triggered state of FIG. 10B is at least partially responsible for resetting the striker arm from the triggered position of FIG. 10B to the ready position of FIG. 10A. In an embodiment, the striker 1004 may be actuated magnetically, wherein the powering of a magnetic element of the striker 1004 may be configured to selectively compress the striker spring 1004d and thrust the striker arm 1004b downward, as seen in FIG. 10B.

The striker 1004 may further comprise a striker head 1004e engaged with the striker arm 1004b, wherein the striker head 1004e is configured to be disposed below the striker body 1004a and a striker arm ring 1004f disposed between the striker head 1004e and the striker arm 1004b. The striker ring 1004f may be configured such that it is sufficiently large to prevent the striker head 1004e from nesting within the striker body 1004a, despite the natural tendency of the striker spring 1004d to pull the striker arm 1004b upward. In an embodiment, auxiliary electrical elements, such as a motor, servo or electromagnet, within the striker 1004 may be configured to actuate the striker 1004 to launch the striker head 1004*e* down to drop the trap door 1009, and to return the striker arm 1004*b* from the triggered position of FIG. 10B to the ready position of FIG. 10A, as will be described in hereinbelow. In an alternative embodiment, the striker 1004 may be configured to be reset or otherwise returned from the "trigger position" of FIG. 10B to the "ready position" of FIG. 10A by the actuator, such as actuator 917 of FIG. 9A, as a result of the upward rotation of the trap door 1009 forcing the striker arm 1004*b* back upward within the striker body 1004*a*. In an embodiment, the striker arm 1004*b*, striker cap 1004*c*, striker head 1004*e* and striker arm ring 1004*f* may form a monolithic structure, wherein a different portion of the striker arm 1004*b* is nested within the striker body 1004*a* depending on the power state of the striker, as seen in FIGS. 10A-10B, and the sticker arm 1004*b* is disposed between and engaged with the striker cap 1004*c* and the striker head 1004*e*.

In order to facilitate the actuation of the striker 1004 upon the sensor being tripped, a striker wire 1004*g* may be associated with the striker body 1004*a* such that the striker 1004 is in electrical communication with the sensor, such as sensor 916 of FIG. 9A-9B, through said striker wire 1004*g*. Upon the sensor detecting the pest(s) within the trap chamber, said sensor may be configured to quickly send a corresponding electrical signal to the striker 1004 through the striker wire 1004*g*, wherein the receipt of said electrical signal by the striker 1004 is configured to actuate the striker arm 1004*b* from the retracted state of the ready position of FIG. 10A to the extended state of the triggered position of FIG. 10B. This in turn forcibly impacts the trap door 1009 of the drop cover, forcing it to disengage with the trap latch, such as trap latch 115 of FIG. 1D, and rotate downward into the trap chute. In an embodiment, the striker 1004 may be configured to impact the trap door 1009 directly to facilitate the dropping of the trap door 1009, wherein the trap latch may be configured to support and engage with the trap door 1009 while in a ready position, and disengage from the trap door 1009 upon the trap door 1009 being impacted by the striker head 1004*e*.

In an embodiment, the disclosed striker 1004 may be a solenoid, wherein FIG. 10A and FIG. 10B correspond to different power states of the solenoid. In an embodiment, the solenoid 1004 may be configured to be in the "ready state" of FIG. 10A while the solenoid 1004 is powered off, whereas the solenoid 1004 may be configured to be transition into the "triggered state" of FIG. 10B while the solenoid is powered on. In said embodiment, the triggering of the sensor may send an electrical signal to the solenoid to power on, thus propelling the striker arm 1004*b* downward, causing the striker head 1004*e* to strike the trap door 1009 to capture a pest within the trap chamber. The solenoid 1004 may also be configured such that after the striker arm 1004*b* strikes the trap door 1009, the solenoid 1004 may be powered off again to pull the striker arm 1004*b* back up within the striker body 1004*a*, as a result of the tension on the striker spring 1004*d* while in the triggered position, thus returning the solenoid 1004 to its "ready state" of FIG. 10A. In an embodiment, the solenoid 1004 may be powered by conventional power source, such as a conventional wall outlet.

Figures 11A, 11B:
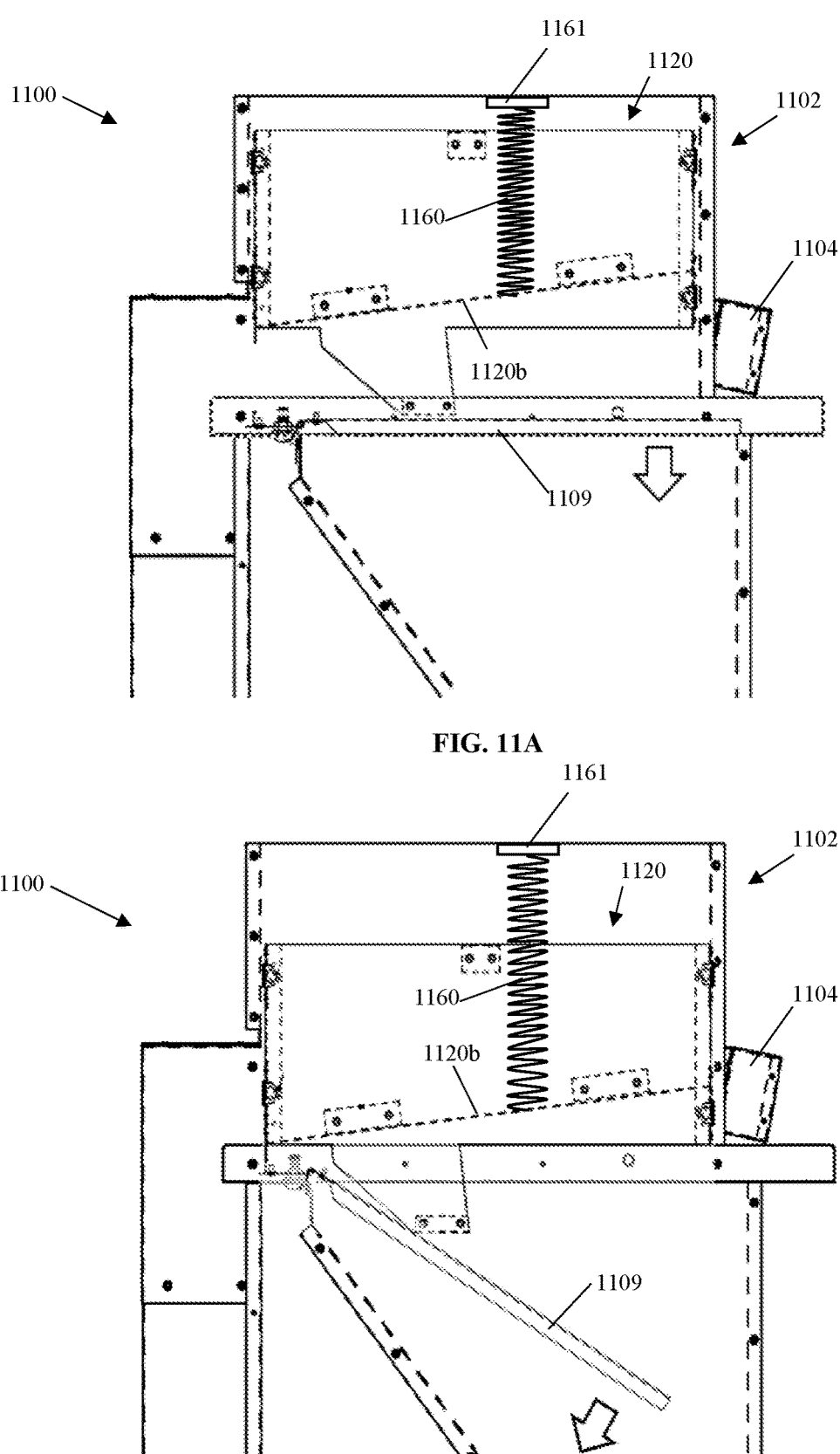
FIG. 11A illustrates the front cross-sectional view of the pest trap apparatus having a shuttle spring in the "ready position", according to an aspect.
FIG. 11B illustrates the front cross-sectional view of the pest trap apparatus having a shuttle spring in the "triggered position", according to an aspect.

FIG. 11A illustrates the front cross-sectional view of the pest trap apparatus 1100 having a shuttle spring 1160 in the "ready position", according to an aspect. FIG. 11B illustrates the front cross-sectional view of the pest trap apparatus 1100 having a shuttle spring 1160 in the "triggered position", according to an aspect. In order to allow the pest trap apparatus 1100 to operate in lower gravity or zero gravity environments, certain modifications may be made to the pest trap apparatus and its elements. As described hereinabove, the pest container, such as pest container 113 of FIG. 1, may utilize an adhesive material to facilitate the capture of pests dropped into it in lower gravity conditions. Additional structures, such as a shuttle spring 1160 may be utilized in order to ensure the shuttle box 1120 "drops" within the trap chamber 1102 after the trap door 1109 is impacted by the striker 1104, regardless of gravitation conditions.

In an embodiment, the pest trap apparatus further comprises a spring mount 1161 engaged with the trap chamber 1102 and a shuttle spring 1160 engaged with the spring mount 1161 and the shuttle box 1120. The spring mount 1161 may comprise a pair of 2-inch long mounting portions disposed on opposing sides of the spring mount 1161, wherein each 2-inch mounting portion is configured to engage with a different side of the trap chamber 1102. In said embodiment, the shuttle spring 1160 may be configured to engage with the shuttle plate 1120*b* of the shuttle box 1120, such that the shuttle spring is configured to be selectively compressed between the shuttle plate 1120*b* and the spring mount 1161. The shuttle spring 1160 may be configured such that while the pest trap apparatus 1100 is in the ready position of FIG. 11A, the shuttle spring 1160 is compressed, and while the pest trap apparatus 1100 is in the triggered position of FIG. 11B, the shuttle spring 1160 is expanded/relaxed. While the shuttle spring 1160 is compressed in the ready position of FIG. 11A, said shuttle spring 1160 may exert a downward force on the shuttle box 1120 and thus the trap door 1109, wherein said downward force exerted by the compressed shuttle spring 1160 is insufficient to disengage the trap door 1109 from the trap latch, such as trap latch 915 of FIG. 9A. In an embodiment, the spring mount 1161 may be 3 inches wide, and span across a top portion of the trap chamber 1102.

Upon the trap door 1109 being impacted by the striker 1104, the trap door 1109 may disengage from the trap latch and drop downward, as described hereinabove. Simultaneously, the force exerted on the shuttle box 1120 by the shuttle spring 1160 may send the shuttle box 1120 downward within the trap chamber 1102, regardless of gravity conditions. It should be understood that after the pest trap apparatus is triggered, and the trap door 1109 and shuttle box 1120 are moved downward in the pest trap apparatus 1100, the trap door 1109 and the shuttle box 1120 may be returned to the ready position by the actuator, such as actuator 917 of FIG. 9A, as described hereinabove. It should be understood that the actuator thusly may be configured to overcome the force exerted by the shuttle spring to return the trap door 1109 and shuttle box 1120 to the ready position of FIG. 11A. In an embodiment, the shuttle spring 1160 may be configured to exert 20 lbs of force while compressed, whereas actuator may be configured to exert 35 lbs of force on the trap door 1109 to force it upward, such that the actuator may be configured to return the trap door 1109 and the shuttle box 1120 from the triggered position of FIG. 11B to the ready position of FIG. 11A, despite the force exerted by the shuttle spring 1160 and the weight of the shuttle box 1120, if applicable.

In an embodiment, the shuttle spring may be implemented within a pest trap apparatus 1100 regardless of gravitational conditions, in order to supplement any gravitational force configured to drop the shuttle box 1120 within the trap chamber 1102. As such, this particular pest trap apparatus 1100 embodiment may thusly be configured to operate in low or even zero gravity conditions.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A pest trap apparatus comprising:
an entry channel;
a trap chamber associated with the entry channel, such that a pest may enter the trap chamber through the entry channel;
a drop cover associated with the trap chamber, the drop cover having a trap door configured to be pivotally engaged with the trap chamber, such that the trap door selectively provides a floor to the trap chamber, and the drop cover having a bottom jaw associated with the trap chamber;
a trap latch associated with the trap chamber and configured to be selectively engaged with the trap door;
a trap chute associated with and disposed below the trap chamber;
a shuttle box configured to be nested within the trap chamber and supported by the trap door, the shuttle box comprising a top jaw;
a sensor associated with the trap chamber, the sensor being configured to generate and transmit a signal upon detecting a pest within the trap chamber; and
a striker in electrical communication with the sensor, such that upon receiving the signal from the sensor, the striker is configured to impact the trap door to disengage the trap door from the trap latch and rotate the trap door downward; wherein the downward rotation of the trap door is configured to drop the shuttle box within the trap chamber and drop a pest within the trap chamber down into the trap chute disposed below the trap chamber, wherein the dropping of the shuttle box within the trap chamber is configured to engage the top jaw with the bottom jaw to prevent pests within the trap chamber from exiting the trap chamber through the entry channel.

2. The pest trap apparatus of claim 1, further comprising an actuator configured to reset the trap door after the downward rotation of the trap door by rotating the trap door upward to reengage the trap door with the trap latch.

3. The pest trap apparatus of claim 1, wherein the trap latch is configured to be magnetically engaged with the trap door.

4. The pest trap apparatus of claim 1, wherein the sensor is an infrared tripwire.

5. A pest trap apparatus comprising:
an entry channel having an entry passage, an exit passage, and a channel body disposed between and associated with the entry passage and the exit passage;
a trap chamber associated with the entry channel, such that the exit passage is engaged with the trap chamber;
a bait cage configured to be engaged with the trap chamber, wherein the bait cage is configured to hold a piece of bait to attract a pest into the trap chamber without allowing the pest to access the piece of bait;

a drop cover associated with the trap chamber, the drop cover having:

a hinge mount engaged with the trap chamber;

a bottom jaw engaged with the hinge mount; a trap hinge engaged with the hinge mount; and a trap door engaged with the trap hinge, such that the trap door can be pivoted with respect to the hinge mount, wherein the trap door is configured to be selectively rotated on a trap door rotational axis about a pivotal engagement of the trap door with the trap hinge;

a trap latch configured to be selectively engaged with the trap door to prevent rotation of the trap door;

a trap chute associated with and disposed below the trap chamber;

a sensor associated with the trap chamber, wherein the sensor is configured to generate and transmit a signal upon detecting a pest within the trap chamber;

a striker in electrical communication with the sensor, such that the striker is configured to be actuated upon receiving the signal from the sensor, wherein the striker is configured to selectively impact the trap door to facilitate disengagement of the trap door from the trap latch, subsequent downward rotation of the trap door and thus a dropping of the pest within the trap chamber into the trap chute;

an actuator configured to be selectively engaged with the trap door to facilitate selective upward rotation of the trap door and reengagement of the trap door with the trap latch; and a shuttle box having a shuttle body and a top jaw engaged with and disposed below the shuttle body, the shuttle box being configured to be nested within the trap chamber and supported by the trap door, such that the selective downward rotation of the trap door drops the shuttle box within the trap chamber, such that the top jaw of the shuttle box is configured to be selectively engaged with the bottom jaw of the drop cover, thus preventing the pest within the trap chamber from returning to the exit passage of the entry channel.

6. The pest trap apparatus of claim 5, further comprising a pest container disposed below and associated with the trap chute, wherein the pest container is configured to securely detain the pest dropped from the trap chamber.

7. The pest trap apparatus of claim 5, wherein the sensor is an infrared tripwire disposed within the trap chamber.

8. The pest trap apparatus of claim 5, further comprising a bait fan configured to be associated with the bait cage, wherein the bait fan is further configured to propel a scent of the piece of bait into the trap chamber.

9. The pest trap apparatus of claim 5, wherein the engagement between the top jaw and the bottom jaw is configured to break objects disposed between the trap chamber and the entry channel after the trap door is dropped.

10. The pest trap apparatus of claim 5, wherein the trap latch is configured to be magnetically engaged with the trap door.

11. The pest trap apparatus of claim 5, wherein the shuttle box further comprises a shuttle plate associated with the shuttle body, a shuttle support associated with and disposed below the shuttle body, and a pair of support rollers associated with the shuttle support, such that the support rollers are configured to rest on the trap door to facilitate smooth rolling of the shuttle box as the shuttle box changes elevation within the trap chamber, wherein the shuttle plate is configured to drop within the trap chamber as the shuttle box descends, thus further preventing the escape of the pest within the trap chamber.

12. The pest trap apparatus of claim 5, further comprising a trap door reset switch associated with the trap chute and in electrical communication with the actuator, wherein the trap door reset switch is configured to trigger the actuator to begin the selective upward rotation of the trap door after the trap door is rotated downward into the trap chute and engaged with the trap door reset switch.

13. The pest trap apparatus of claim 5, further comprising a spring mount configured to be engaged with the trap chamber and a shuttle spring configured to be engaged with the spring mount and the shuttle box, wherein the shuttle spring is configured to exert a downward force on the shuttle box, such that the shuttle box is forced downward upon the disengagement of the trap door from the trap latch.

* * * * *